(12) United States Patent
Fitzpatrick

(10) Patent No.: US 10,936,179 B2
(45) Date of Patent: Mar. 2, 2021

(54) METHODS AND SYSTEMS FOR WEB CONTENT GENERATION

(71) Applicant: PAGECLOUD INC., Ottawa (CA)

(72) Inventor: Craig Fitzpatrick, Ottawa (CA)

(73) Assignee: Pagecloud Inc., Ottawa (CA)

( * ) Notice: Subject to any disclaimer, the term of this patent is extended or adjusted under 35 U.S.C. 154(b) by 0 days.

(21) Appl. No.: 16/736,125

(22) Filed: Jan. 7, 2020

(65) Prior Publication Data

US 2020/0257437 A1 Aug. 13, 2020

Related U.S. Application Data

(62) Division of application No. 15/310,944, filed as application No. PCT/CA2015/000307 on May 14, 2015, now Pat. No. 10,572,126.

(60) Provisional application No. 61/992,986, filed on May 14, 2014.

(51) Int. Cl.
| | |
|---|---|
| *G06F 3/0484* | (2013.01) |
| *G06F 16/958* | (2019.01) |
| *G06F 40/14* | (2020.01) |
| *G06F 40/106* | (2020.01) |
| *G06F 40/109* | (2020.01) |
| *G06F 40/134* | (2020.01) |
| *G06F 40/137* | (2020.01) |
| *G06F 40/186* | (2020.01) |
| *G06F 3/0486* | (2013.01) |

(52) U.S. Cl.
CPC ........ *G06F 3/04845* (2013.01); *G06F 3/0486* (2013.01); *G06F 16/958* (2019.01); *G06F 40/106* (2020.01); *G06F 40/109* (2020.01); *G06F 40/134* (2020.01); *G06F 40/137* (2020.01); *G06F 40/14* (2020.01); *G06F 40/186* (2020.01)

(58) Field of Classification Search
CPC .. G06F 3/04845; G06F 16/958; G06F 40/134; G06F 40/109
See application file for complete search history.

(56) References Cited

U.S. PATENT DOCUMENTS

| | | | |
|---|---|---|---|
| 7,325,188 B1 * | 1/2008 | Covington | G06F 16/958 715/234 |
| 8,813,178 B1 * | 8/2014 | Khanna | G06Q 10/10 726/1 |

(Continued)

*Primary Examiner* — David E Choi
(74) *Attorney, Agent, or Firm* — Rosenberg, Klein & Lee

(57) ABSTRACT

Whilst the Internet has become a dominant communications medium through a variety of services the main portal to the vast majority of this content is through a webpage associated with a user, a group, enterprise, retailer etc. For those generating the content they are today essentially stuck with two options, one expensive option for full creative control and flexibility via web developers and website development enterprises, the other cheaper option to use an enterprise offering templates and work within their constraints. In contrast, embodiments of the invention provide conventional features the user is familiar with such as cut, copy, paste etc. allowing them to edit, manipulate, and create directly within a webpage using a tool that works directly within their website such that changes are automatically live on the Internet when completed but has the familiarity of a standard graphics editing or word processing tool.

4 Claims, 20 Drawing Sheets

(56) References Cited

U.S. PATENT DOCUMENTS

| | | | |
|---|---|---|---|
| 2003/0150907 A1* | 8/2003 | Metcalf | G06Q 20/4014 235/375 |
| 2003/0167213 A1* | 9/2003 | Jammes | G06Q 30/0641 705/26.62 |
| 2010/0275161 A1* | 10/2010 | DiCamillo | G06F 40/103 715/810 |
| 2010/0299183 A1* | 11/2010 | Fujioka | G06Q 30/0241 705/14.4 |
| 2014/0164574 A1* | 6/2014 | Gao | H04L 67/06 709/219 |
| 2014/0250369 A1* | 9/2014 | Mitnick | G06F 40/166 715/235 |
| 2014/0258843 A1* | 9/2014 | Krueger | G06F 40/14 715/234 |
| 2015/0039996 A1* | 2/2015 | Kwon | G06F 40/154 715/234 |
| 2015/0178476 A1* | 6/2015 | Horton | G06F 40/109 726/26 |
| 2015/0363400 A1* | 12/2015 | Hernandez | G06F 16/24552 707/736 |
| 2017/0090734 A1* | 3/2017 | Fitzpatrick | G06F 3/04845 |

* cited by examiner

500A

500B

500C

600A

600B

600C

700A

700B

700C

700D

700E

700F

1500A

1500B

METHODS AND SYSTEMS FOR WEB CONTENT GENERATION

CROSS-REFERENCE TO RELATED APPLICATIONS

This patent application claims the benefit as a divisional of U.S. patent application Ser. No. 15/310,944 entitled "Methods and Systems for Web Content Generation" filed Nov. 14, 2016 which itself claims priority as a 371 National Phase entry application of Patent Cooperation Treaty Application PCT/CA2015/000,307 entitled "Methods and Systems for Web Content Generation" filed May 14, 2015, which itself claims the benefit of U.S. Provisional Patent Application 61/992,986 filed May 14, 2014 entitled "Methods and Systems for Web Content Generation", the entire contents of each being incorporated herein by reference.

FIELD OF THE INVENTION

This invention relates to Internet content generation and more particularly to improved tools for the acquisition, modification, and generation of webpages, webapps and websites.

BACKGROUND OF THE INVENTION

The Internet is a global system of interconnected computer networks that use the standard Internet protocol suite communication protocols, e.g. TCP/IP, to link several billion devices worldwide. It is essentially a network of networks that consists of millions of private, public, academic, business, and government networks, of local to global scope, that are linked by a broad array of electronic, wireless, and optical networking technologies. The Internet carries an extensive range of information resources and services, such as the inter-linked hypertext documents and applications of the World Wide Web (WWW), the infrastructure to support email, and peer-to-peer networks for file sharing and telephony.

Though the Internet has been widely used by academia since the 1980s, the commercialization of what was by the 1990s an international network resulted in its popularization and incorporation into virtually every aspect of modern human life. As of April 2014, approximately 3 billion people, nearly 40% of the world's human population have an Internet connection. Over the past thirty years most traditional communications media including telephone, music, film, and television are being reshaped or redefined by the Internet, giving birth to new services such as voice over Internet Protocol (VoIP) and Internet Protocol television (IPTV). Newspaper, book, and other print publishing are adapting to website technology, or are reshaped into blogging and web feeds. The Internet has enabled and accelerated new forms of human interactions through instant messaging, Internet forums, and social networking. Online shopping has boomed both for major retail outlets and small artisans and traders. Business-to-business and financial services on the Internet affect supply chains across entire industries.

The vast majority of user engagement with the Internet, especially for the average individual, is through webpages and websites. A website, is a set of related webpages served from a single web domain, and is hosted on at least one web server, accessible via a network such as the Internet or a private local area network through an Internet address known as a Uniform Resource Locator (URL). All publicly accessible websites collectively constitute the World Wide Web. Each webpage is a document, typically written in plain text interspersed with formatting instructions in a language, e.g. Hypertext Markup Language (HTML, XHTML). Webpages may incorporate elements from other websites with suitable markup anchors as well as links to other webpages on the same website or other websites, the latter being typically accessed via hypertext links.

In order to view information a user launches an application, often referred to as a web browser, and navigates to a webpage through a search or a stored link, its web address. The web browser rendering the page content according to its HTML markup instructions onto a display terminal wherein the content and HTML markup instructions have been transported with the Hypertext Transfer Protocol (HTTP), which may optionally employ encryption (HTTP Secure, HTTPS) to provide security and privacy for the user of the webpage content. The URLs of the pages organize them into a hierarchy, although hyperlinking between them conveys the reader's perceived site structure and guides the reader's navigation of the site which generally includes a home page with most of the links to the site's web content, and a supplementary about, contact and link page.

Some websites require a subscription to access some or all of their content. Examples of subscription websites include many business sites, parts of news websites, academic journal websites, gaming websites, file-sharing websites, message boards, web-based email, social networking websites, websites providing real-time stock market data, and websites providing various other services (e.g., websites offering storing and/or sharing of images, files and so forth).

However, irrespective of the content, the structure, the website, etc. every single webpage on every single website has had to be generated. Whilst, some webpages may display results from searches these search results are webpages or portions of webpages. With an estimated 100 billion plus webpages on over 100 million websites that is a vast amount of human resources applied to the design, layout, configuration of those webpages. At present creating a website generally involves two primary jobs, the web designer and web developer, who often work closely together on a website. The web designers are responsible for the visual aspect, which includes the layout, coloring and typography of a webpage and will typically have a working knowledge of using a variety of languages such as HTML, Cascading Style Sheets (CSS), JavaScript, PHP (a server-side scripting language) and Flash to create a site, although the extent of their knowledge will differ from one web designer to another. Particularly in smaller organizations one person will need the necessary skills for designing and programming the full webpage, while larger organizations may have a web designer responsible for the visual aspect alone. In other particular circumstances, other individuals may become involved during the creation of a website including, for example, graphic designers (to create visuals for the site such as logos, layouts and buttons), Internet marketing specialists (who help maintain web presence through strategic solutions targeting viewers), search engine optimizers (SEOs, who research/recommend website language to increase website visibility on search engines), Internet copywriters (to create the written content), and user experience (UX) designers (who address end-user design considerations).

As a result establishing a website whilst being a major, often vital, element of an enterprise's or organization's strategy can be an expensive proposition which is not helped by the need to support both desktop and mobile users as well as potentially supporting multiple languages to address user's in different geographical regions. Due to the lower bandwidth, reduced display capabilities, and typically lower processor capabilities a mobile webpage/website is generally less complex and less graphically intensive than a desktop webpage/web site.

Accordingly, over the past decade whilst professional design tools for webpages/websites have improved a parallel development has occurred geared to the individual, the smaller enterprise, etc. wherein they can design and implement a website and its webpages through the use of templates that are pre-configured and remove the requirements of the user to understand web design and development tools. In many instances these are discrete third party services but increasingly these are bundled as part of an overall package from enterprises such as GoDaddy™, Wix™, and WordPress.com wherein the user can register an Internet domain, generate their website and have it hosted so that they do not need to worry about servers, scalability etc.

However, this leaves the user with essentially two options, the first with full creative control and flexibility is to exploit web developers and website development enterprises to generate exactly what they want. The second is to select a template from those available and work within its constraints. The former is typically suited to established enterprises that can justify the marketing budget and quantify the return on investment whilst the latter is typically employed by small and new enterprises, individuals, etc. to establish a web presence without incurring significant costs for unknown return on investment.

Accordingly, it would be beneficial to provide users with the ability to establish a webpage and/or website with a design that they want within a generation tool that they find easy and intuitive to use. The former, i.e. the generation tool, beneficially is the very same web browser that their users will view the webpage/website with whilst the latter, the intuitive and easy use, is the same features that they will be familiar with from word processing, graphics editors, etc.

It would be further beneficial for a user, when generating their webpage(s) and/or website(s) to be able to rapidly duplicate an existing webpage/website and then edit it to reflect the changes that they want. For example, a florist offering twenty floral arrangements may wish to have twenty webpages each essentially identical in theme and content with the variations for each particular arrangement's image, cost, and options. Similarly, a small local chain of restaurants may wish to establish a website for each location so that it reflects the neighbourhood it is within but have similar structure and many common elements. Accordingly, being able to easily copy a webpage, edit it, and save it would be beneficial.

It would be further beneficial for the user's edits, amendments, etc. to their webpage(s)/website(s) to be automatically and rapidly available online once they have completed them rather than awaiting their service provider's upload of modified content. It would be further beneficial for the user to be able to rapidly add extended features to their website such as videos, widgets etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to Internet content generation and more particularly to improved tools for the acquisition, modification, and generation of webpages, webapps and websites.

A method of generating a webpage by opening a first webpage within a web browser, processing the content of the first webpage with a web based application, copying the processed webpage content, and pasting or directing the copied processed webpage content to generate a second webpage.

A method of copying and pasting a predetermined portion of a first webpage by opening the first webpage within a web browser, processing the content of the first webpage with a web based application, copying a predetermined portion of the processed webpage content, and pasting or directing the copied predetermined portion of the processed webpage content to a second webpage such that all formatting and visible characteristics of the copied content are preserved.

In accordance with an embodiment of the invention there is provided a method of copying content from one webpage to another comprising the steps of:
scanning and analyzing the elements of content of the webpage to be copied to identify assets; converting the identified assets into a format suitable for manipulation; copying the converted identified assets into a memory; and at least one of:
    pasting or directing the converted identified assets into the other webpage from the memory; and
    directly generating the converted identified assets within the other webpage from the memory.

In accordance with an embodiment of the invention there is provided a method of linking a font to a webpage comprising:
receiving an indication of a font to be linked to the webpage; determining a name and properties of the font;
locating a font file associated with the font;
using a font-converter system to split the font file into a plurality of discrete font files; and
at least one of:
    copying the discrete font files to a repository and establishing links to them; and
    linking to the original sources in all formats associated with the discrete font files.

In accordance with an embodiment of the invention there is provided a method of editing a webpage stored on a remote server with a local web browser on a device by a user, the device comprising at least a microprocessor and where the changes made on the local web browser are made directly within a web inspector associated with the web browser and saved on the remote server so that they become permanent.

In accordance with an embodiment of the invention there is provided a method of adding content to a webpage by at least one of dragging a file into a web browser and pasting a file into a web browser from a clipboard such that the content of the file can be at least one of expanded, converted to a webpage and manipulated within the web browser, wherein the file is expressed in a proprietary file format.

In accordance with an embodiment of the invention there is provided a method of adding a widget to a webpage comprising receiving an identity of an item of content to be added, determining what widget is appropriate for the item of content, and generating the appropriate widget.

In accordance with an embodiment of the invention there is provided a method of generating portable webpage content comprising at least one of cutting and copying content within a web browser from an editable webpage into a clipboard of an operating system of an electronic device upon which the web browser application is in execution.

A method comprising generating portable content from a predetermined portion of a webpage, saving the portable content into a file, exchanging the file with another electronic device, and inserting the portable content into another webpage to re-instantiate the predetermined portion of the webpage.

In accordance with an embodiment of the invention there is provided a method of providing at least one of an undo function and a redo function to a webpage application for generating and/or editing a webpage comprising serializing every change to the webpage as a text difference, storing the text differences with the webpage, and allowing the user through the web browser to sequentially move through the serialized changes in either direction in future sessions within a web browser accessing the webpage.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
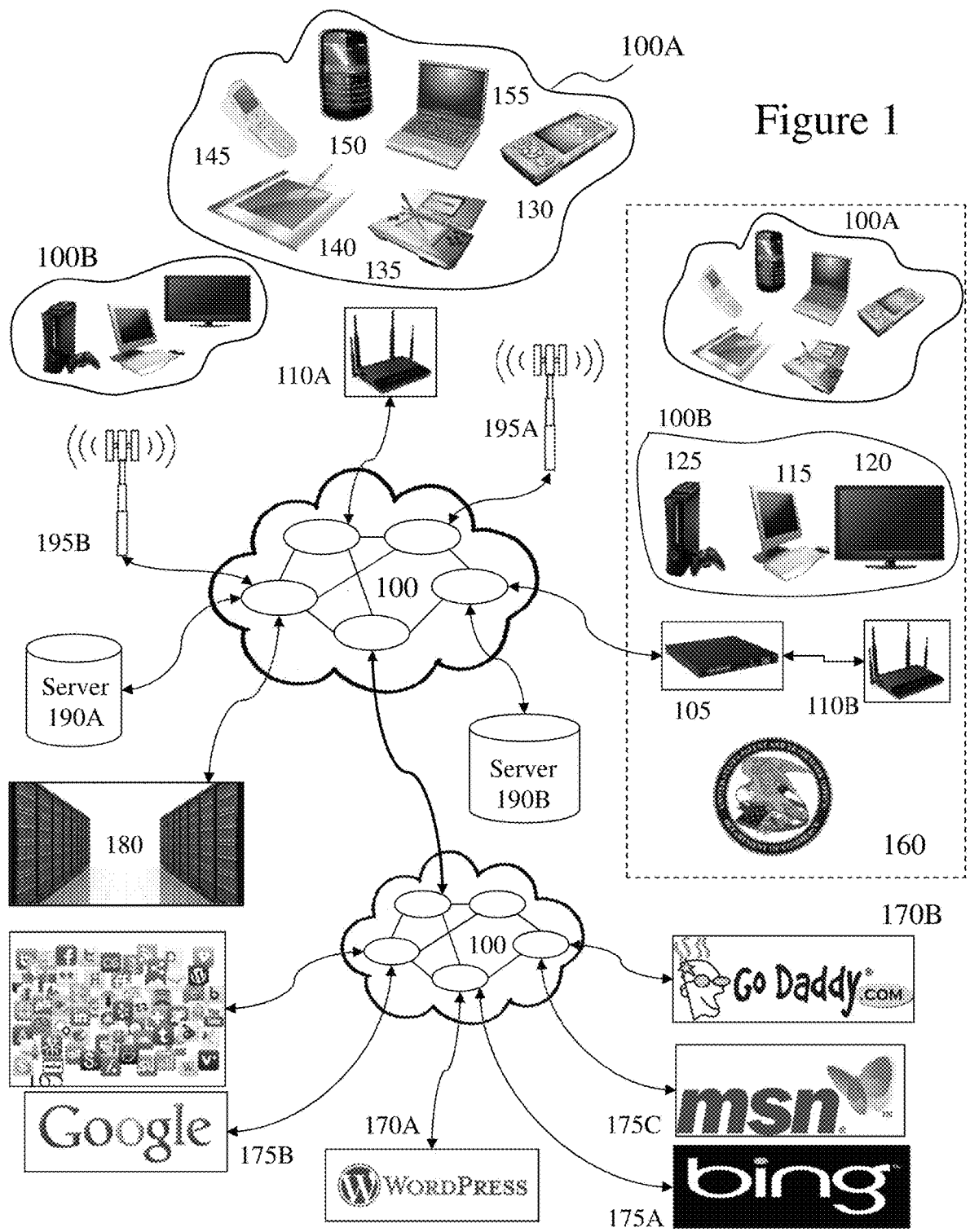
FIG. 1 depicts a network environment within which embodiments of the invention may be employed.

The present invention is directed to Internet content generation and more particularly to improved tools for the acquisition, modification, and generation of webpages, webapps and websites. The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and programming tools (with which computer programs are created). Generally, within the following description with respect to embodiments of the invention an application is generally presented in respect of software permanently and/or temporarily installed upon a PED and/or FED.

A "web application" (commonly referred to as a "web app" or "webapp") as used herein may refer to, but is not limited to, application software accessible by a user over a network such as the Internet or an intranet that runs in a web browser or is created in a browser-supported programming language, e.g. a combination of JavaScript, HTML and CSS, and relies upon a web browser to render the application executable. This includes webapps, but is not limited to, such as webmail, online retail sales, online auctions, social networks, social media, wikis, message boards, office software (e.g. word processors, online spreadsheets, and presentation tools), project management, computer-aided design, video editing, multimedia content presentation, point-of-sale applications.

A "web browser" (commonly referred to as a "browser") as used herein may refer to, but is not limited to, a software application for retrieving, presenting and traversing information resources such as those on the World Wide Web and the Internet or accessible via web servers in an intranet, a private network, or files in file systems. An information resource being typically identified by a Uniform Resource Identifier/Uniform Resource Locator (URI/URL) and may be, for example, a webpage, a website, multimedia content, image content, text content, or other items of content. Hyperlinks present within information resources allow users easily to navigate their browsers to related information resources. This includes, but is not limited to, Firefox™, Internet Explorer™, Google Chrome™, Opera™, and Apple Safari™.

A "webpage" (or "web page") as used herein may refer to, but is not limited to, a web document that is suitable for the World Wide Web and a web browser. A web browser displays a webpage on a display, such as that associated with a PED and/or FED. A webpage is what displays, but the term also refers to a computer file, usually written in HTML or comparable markup language, whose main distinction is to provide hypertext that will navigate to other webpages via links. Web browsers coordinate web resources centered on the written webpage, such as style sheets, scripts and images, to present the webpage. On a network, a web browser can retrieve a webpage from a remote web server. On a higher level, the web server may restrict access to only a private network such as a corporate intranet or it provide access to the World Wide Web. On a lower level, the web browser uses the Hypertext Transfer Protocol (HTTP) to make such requests. A static webpage is delivered exactly as stored, as web content in the web server's file system, while a dynamic webpage is generated by a web application that is driven by server-side software or client-side scripting. Dynamic webpages help the browser (the client) to enhance the webpage through user input to the server. A webpage is essentially a document, typically written in plain text interspersed with formatting instructions of HTML and/or XHTML either discrete or incorporating elements from other websites via suitable markup anchors.

A "website" (also known as "web site" or simply "site") as used herein may refer to, but is not limited to, a set of related webpages served from a single web domain. A website is hosted on at least one web server, accessible via a network such as the Internet or a private local area network through a URL. All publicly accessible websites collectively constitute the World Wide Web. The webpages of a website are Webpages are accessed and transported with the Hypertext Transfer Protocol (HTTP), which may optionally employ encryption (HTTP Secure, HTTPS) to provide security and privacy for the user of the webpage content. The user's application, often typically a web browser, renders the page content according to its HTML markup instructions onto a display terminal. The webpages (or simply pages) are accessed and transported with the Hypertext Transfer Protocol (HTTP), which may optionally employ encryption (HTTP Secure, HTTPS) to provide security and privacy for the user of the webpage content. The user's application, typically a web browser, renders the page content according to its HTML markup instructions onto a display terminal. The webpages (or simply pages) of a website can usually be a single URL, commonly referred to as the web address. The URLs of the webpages organize the webpages into a hierarchy, although hyperlinking between them conveys the reader's perceived site structure and guides the reader's navigation of the site which generally includes a home page with most of the links to the site's web content. Each webpage may also be accessed directly through its unique URL. Examples of websites include, but are not limited to, free websites, subscription websites, business websites, news websites, academic journal websites, gaming websites, file-sharing websites, message boards, web-based email, social networking websites, service provider websites, enterprise websites, user websites, and websites offering storing and/or sharing of images, files, etc.

The "the cloud" as used herein may refer to, but is not limited to "cloud computing" which relates to distributed computing over a network, where a program or application may run on many connected computers at the same time. Generally, it refers to computing hardware machines or groups of computing hardware machines commonly referred as servers that are connected through a communication network such as the Internet, an intranet, a local area network (LAN) or wide area network (WAN). Accordingly, "the cloud" or "in the cloud" is metaphor for the Internet where software, platforms and infrastructure are offered/sold "as a service", i.e. remotely through the Internet. Common models of cloud computing service are known as software as a service (SaaS), platform as a service, and infrastructure as a service. These cloud services may be offered in a public, private or hybrid network.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as EventBrite, Facebook, Flickr, Google+, Instagram, LinkedIn, Pinterest, Tumblr, Twitter, Vimeo, Vine, and YouTube; as well as Nexopia, Badoo, Bebo, Delphi, Glocals, Hi5, Hyves, iWiW, Mixi, Nasza-Klasa, Skyrock, Soup, The Sphere, StudiVZ, Tagged, Tuenti, VKontakte, XING, Orkut, Mxit, Cyworld, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals whose biometric data may be, but not limited to, monitored, acquired, stored, transmitted, processed and analysed either locally or remotely to the user wherein by their engagement with a service provider, third party provider, enterprise, social network, social media etc. via a dashboard, web service, website, software plug-in, software application, graphical user interface acquires, for example, electronic content. This includes, but is not limited to, private individuals, employees of organizations and/or enterprises, members of community organizations, members of charity organizations, men, women, children, and teenagers.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as HTML, CSS, JavaScript, XML, SVG, CSV, MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wikaist of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Webpage. Webpages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

Within the description below in respect of FIGS. 4A through 15 and with respect to embodiments of the invention reference is made to a webpage, a webapp, a website, webpages, webapps, and websites. Whilst these terms are generally employed with the associated meanings it would be evident to one skilled in the art that in many aspect of the World Wide Web, Internet, or private networks exploiting these elements that in other instances these terms may be interchangeable and/or multiple terms may apply to a single item. For example, a webapp that displays a single webpage may accordingly if accessed through a URL be also termed a website as may the single webpage. Accordingly, within the description below the use of such terms should be viewed to the fullest/broadest extent through the interchangeability within the art of such terms and to what they relate.

Referring to FIG. 1 there is depicted a network environment 100 within which embodiments of the invention may be employed supporting web content systems and web content applications/platforms (WCS-WCAPs) according to embodiments of the invention. Such WCS-WCAPs, for example supporting multiple channels and dynamic content. As shown first and second user groups 100A and 100B respectively interface to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. United States Patent & Trademark Office (USPTO), within which other first and second user groups 100A and 100B are present. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130.

Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 100A may form associations either through standards such as IEEE 802.15 and Bluetooth as well in an ad-hoc manner.

Also connected to the network 100 are Social Networks (SOCNETS) 165, first and second service providers 170A and 170B respectively, e.g. WordPress™ and GoDaddy™, and first to third party providers 175A to 175C respectively, e.g. Bing™, Google™, and MSN™, as well as first and second servers 190A and 190B which together with others, not shown for clarity. First and second servers 190A and 190B may host according to embodiments of the inventions multiple services associated with a web content systems and web content applications/platforms (WCS-WCAPs); a provider of a SOCNET or Social Media (SOME) exploiting WCS-WCAP features; a provider of a SOCNET and/or SOME not exploiting WCS-WCAP features; a provider of services to PEDS and/or FEDS; a provider of one or more aspects of wired and/or wireless communications; an Enterprise 160 exploiting WCS-WCAP features; license databases; content databases; image databases; content libraries; customer databases; websites; and software applications for download to or access by FEDs and/or PEDs exploiting and/or hosting WCS-WCAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading an application which provides WCS-WCAP features according to embodiments of the invention; execute an application already installed providing WCS-WCAP features; execute a web based application providing WCS-WCAP features; or access content. Similarly, a USER may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
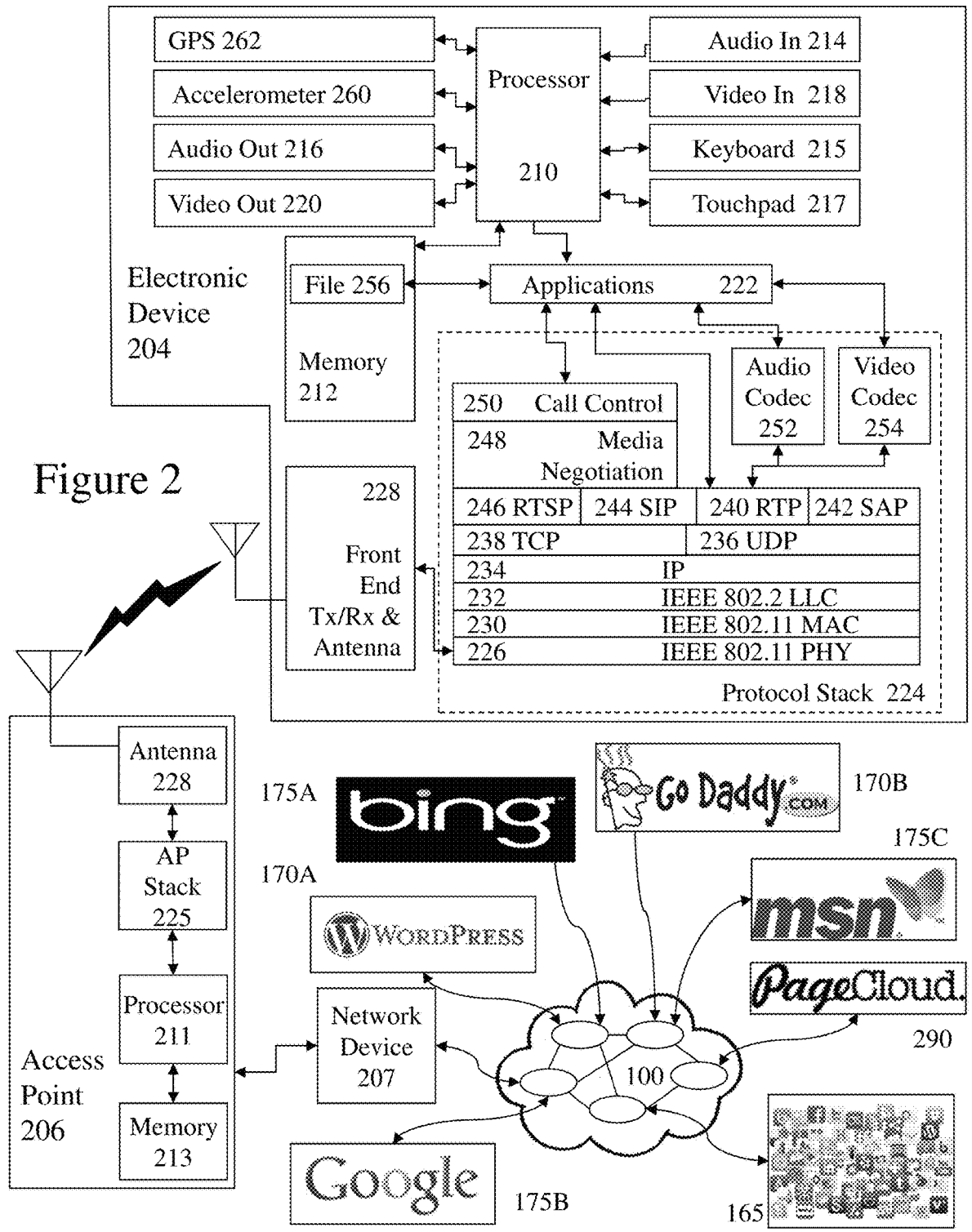
FIG. 2 depicts a wireless portable electronic device supporting communications to a network such as depicted in FIG. 1 and as supporting embodiments of the invention.
Figure 3A:
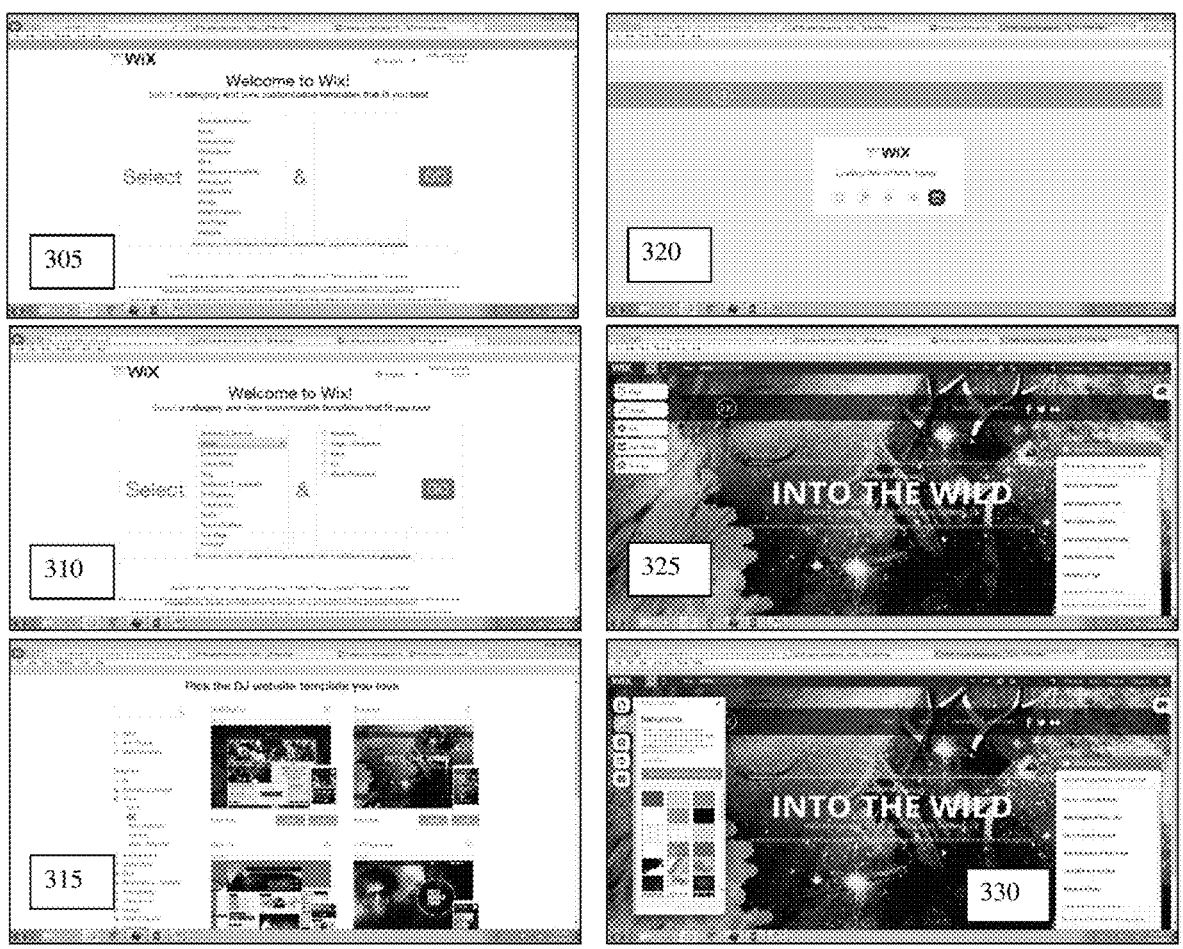
FIGS. 3A to 3D depict a prior art sequence for generating a webpage using a web based web site builder.
Figure 3B:
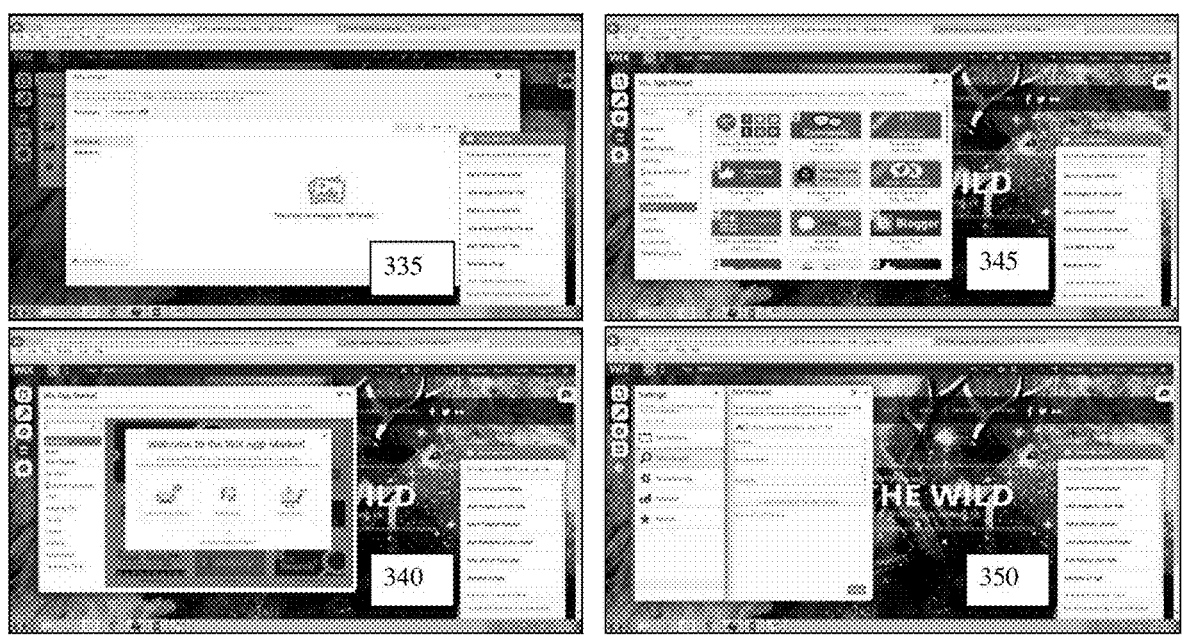
Figure 3C:
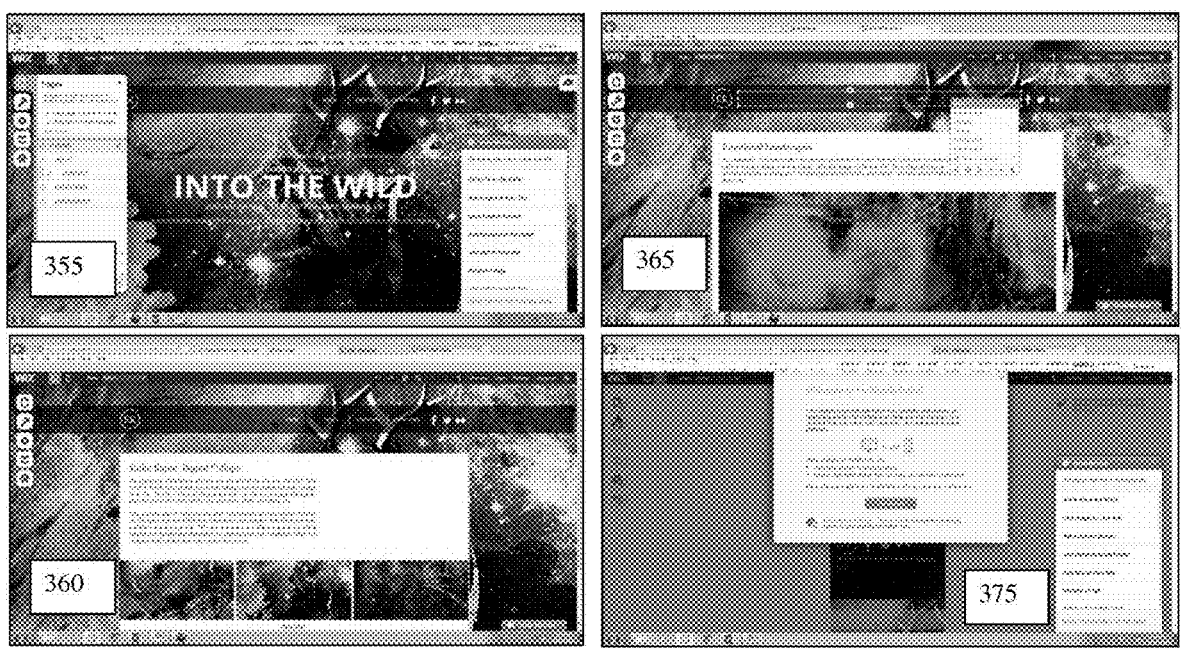
Figure 3D:

Now referring to FIG. 2 there is depicted an electronic device 204 and network access point 207 supporting WCS-WCAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, first and second service providers 170A and 170B respectively, e.g. WordPress™ and GoDaddy™, and first to third party providers 175A to 175C respectively, e.g. Bing™, Google™, and MSN™, and WCS-WCAP provider 290, e.g. PageCloud™.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-2000, DSL, Dial-Up, DOCSIS, Ethernet, G.hn, ISDN, MoCA, PON, and Power line communication (PLC).

Now referring to FIGS. 3A to 3D there is depicted a typical prior art sequence comprising steps 305 to 365 for generating a webpage using a web based website builder, in this instance Wix™, according to the prior art. Also depicted are steps 375 to 395 relating to a mobile webpage builder through the same web based website builder. Accordingly, as depicted steps 305 to 370 comprise:

Step 305—wherein the user selects a category associated with the webpage/website that they wish to establish, for example Business, Music, Creative Arts, Design, Personal, One Pager etc.

Step 310—where the user has selected Music and is now presented with sub-categories for that category, in this instance Musician, Singer, Band, DJ, Production.

Step 315—where the user now can browse templates associated with the category and sub-category they have chosen and select the one they wish to use, some may be free whereas more advanced designs etc. may require purchasing them.

Step 320—wherein having selected the template the website builder loads an editor for the user's interface to edit and amend the content of the template.

Step 325—wherein the selected template is loaded and the user is presented editing and help menus allowing them to rapidly navigate and/or be guided to perform many of the basic aspects of generating their website with the template.

Step 330—where the user has selected to adjust the background and is now presented with options through a scroll list. The number and variety of such backgrounds may vary with the template selected, whether the user is exploiting free features or paid, etc.

Step 335—where the user is guided through the addition of images which may user generated, user acquired, or provided through the website builder for example.

Step 340—wherein the user is guided through the addition of applications to their website/webpage. As depicted three "featured" applications are presented representing contacting users, social media, and retail interface. Other applications may be accessed through the different categories within the index, e.g. new, most popular, free, social, forms, eCommerce, and marketing tools for example.

Step 345—where the user has selected to view options under the social index of the applications and is presented with a scrollable list of applications including, but not limited to, Instagram feed, Facebook "like", blogger feed, comments, and displaying social media feeds.

Step 350—where the user is presented with setting options including, for example, site addresses, social media settings, statistics, and search engine optimization (SEO). The latter providing help to the user to adjust language within their website etc. to enhance the likelihood that their website is returned during browser searches by other users.

Step 355—where the user can navigate and manage the webpages within their website. In this manner the user can establish, for example, a homepage, about page, contact page, and others relating to the content that they wish to display.

Step 360—displays a default home page to the user with exemplary content. The user can edit and replace the text to provide the content that they wish displayed.

Step 365—displays a default page entitled "landscape" which the user can edit and amend to reflect the content that they wish to display.

Accordingly, the user can create a website for desktop display through these steps and repeated sequences of subsets of these steps to add a page, edit the template, save and continue. However, the options presented to the user for editing a page, for example, or adding images etc. are limited to those defined by the template the user selects. In many instances, the user will also wish to establish a mobile website compatible with smartphones etc. Such a mobile website will generally be lower complexity, lower graphics, etc. to support faster loading, easier display etc. on portable electronic devices. In the example depicted with respect to steps 305 to 365 the user can swap to editing their mobile website through selecting the smartphone icon wherein they are presented with a second series of webpages guiding them through the editing of their mobile website in parallel to their desktop website. For example, the user may performs steps 375 to 395 which comprise:

Step 375—which depicts a welcome screen to the user that explains their desktop website is automatically converted to a mobile website.

Step 380—where the user can view the pages of their website in mobile format and navigate through these.

Step 385—where the user is presented with options for adjusting the settings on their mobile webpages. In this instance the user is simply presented with the ability to hide one or more webpages thereby simplifying their mobile website without impacting their desktop website.

Step 390—where the user is presented with options for adjusting content on their mobile webpages. In this instance the user is simply presented with the ability to hide elements on one or more webpages thereby simplifying their mobile website without impacting their desktop website.

Step 395—provides the user with the option to add other elements to their website such as a mobile action bar or a preloader that will load another webpage whilst a user is viewing the one they just navigated to so that the user is not waiting for content to load. The webpage(s) loaded may be established according to techniques known within the art based upon user activities, etc.

Whilst the web based webpage/website builder described with respect to FIGS. 3A to 3D provides a user with a low complexity interface the options are limited and generally constrained to much less functionality, options, etc. than available with a website builder application such as Adobe™ Dreamweaver™, Microsoft™ Expressions Blend 4 and Corel Website Creator. Such software suites provide website developers with advanced design options but require that the user learns and understands how to use the software.

Copy Webpage

Figure 4A:
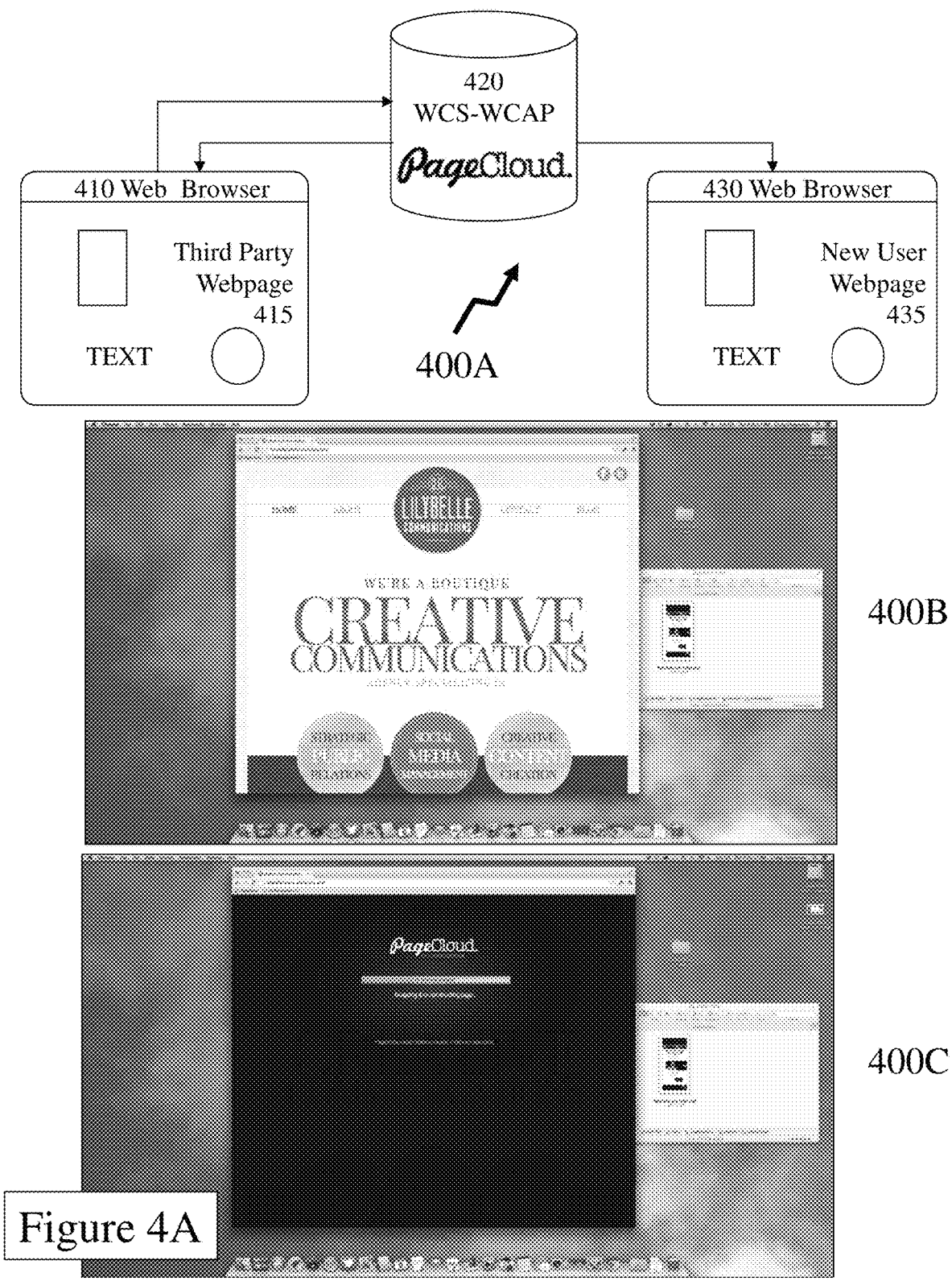
FIGS. 4A and 4B depicts exemplary process and screen images for copying a webpage within a browser according to an embodiment of the invention.
Figure 4B:
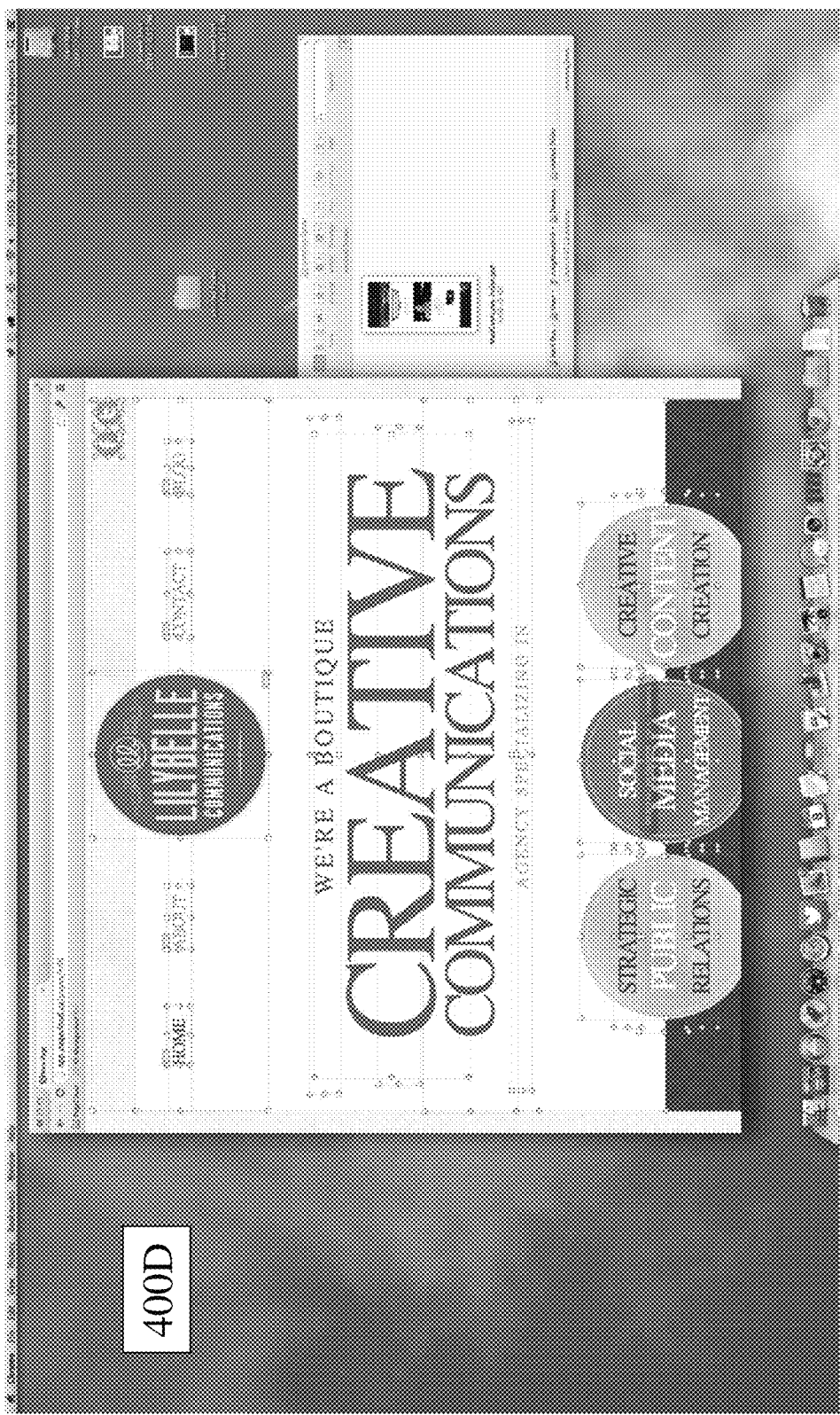

Referring to FIGS. 4A and 4B respectively there are depicted exemplary process 400A and first to third screen images 400B to 400D respectively relating to copying a webpage within a browser according to an embodiment of the invention. As depicted within exemplary process 400A a user initially accesses a web browser 410 and a third party webpage 415 through a web based webpage editor/creator according to an embodiment to the invention, referred within this specification as a web content system and web content applications/platform (WCS-WCAP). Accordingly, the WCS-WCAP algorithms, either in-browser or in-cloud, analyze and de-construct the webpage content of third party webpage 415 and this is then stored within a memory/buffer, either locally or remotely, such that the user can then be presented with a "copy" of the third party webpage 415 as new user webpage 435. This "copy" is actually a recreation of the webpage using the WCS-WCAP algorithms which re-construct the webpage content in editable format and display this to the user as the new user webpage 435. Accordingly, referring to first to third screen images 400B to 400D respectively these three steps are depicted wherein in first screen image 400B the user has navigated to a third party webpage 415, in this instance the home page of Lilybelle Communications, within a WCS-WCAP provided by PageCloud™. Accordingly, they elect to duplicate/copy/replicate wherein the WCS-WCAP algorithms, either in-browser or in-cloud, analyze and de-construct the webpage content of third party webpage which is depicted by second screen image 400C wherein a progress bar relating to the analysis and de-construction is displayed. Subsequently, in third screen image 400D the user elects to re-create wherein the WCS-WCAP algorithms re-construct the webpage content in editable format and display this to the user. As evident from third screen image 400D each element of content is marked with markers indicating that the object may be moved, resized, deleted, etc.

Figure 5:
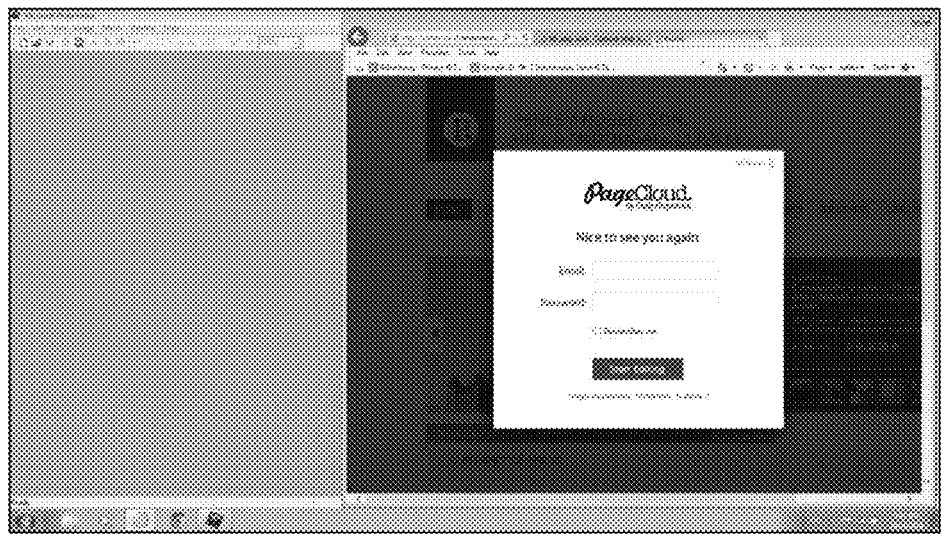
FIGS. 5 and 6 depict exemplary screen images for user using a web based webpage editor/creator according to an embodiment to the invention.
Figure 5:
Figure 5:
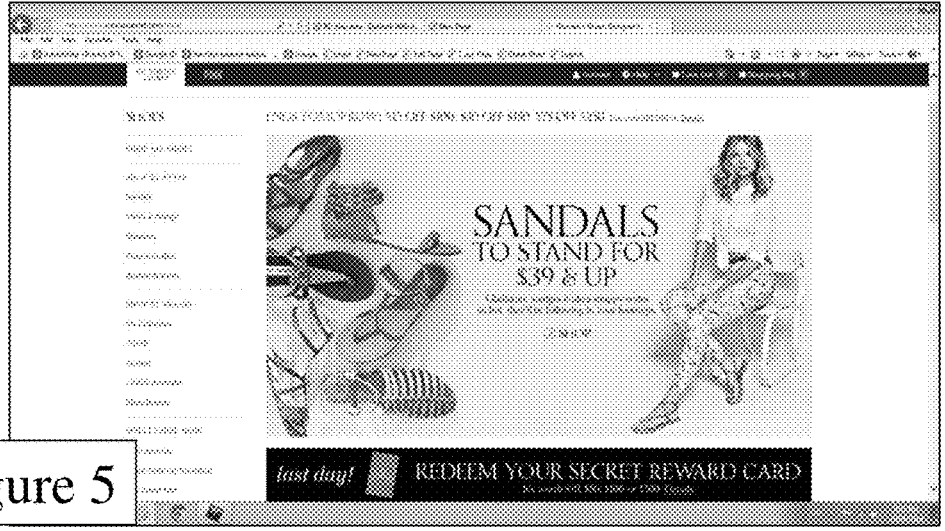
Figure 6:
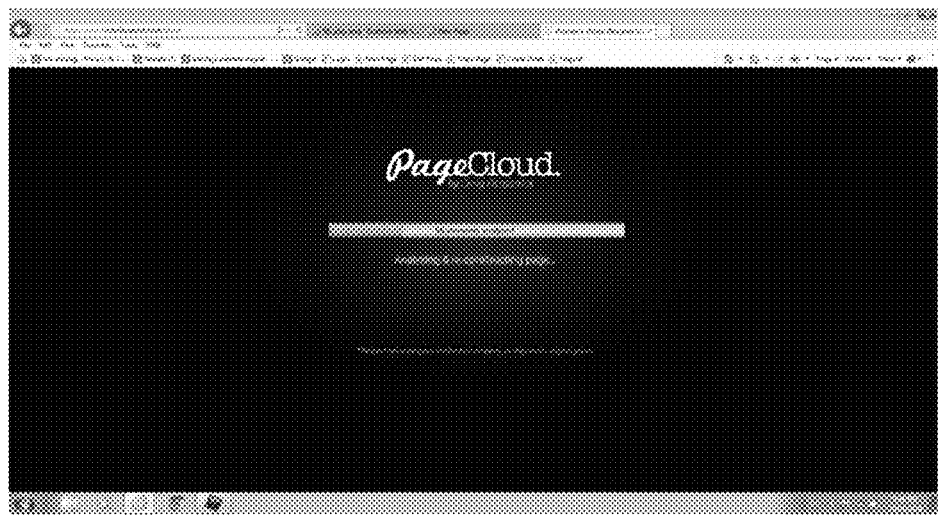
Figure 6:
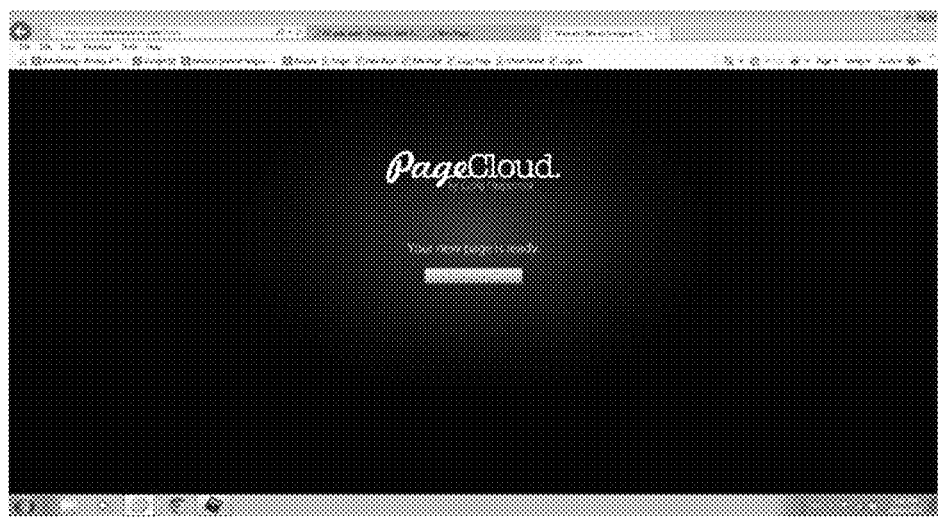
Figure 6:
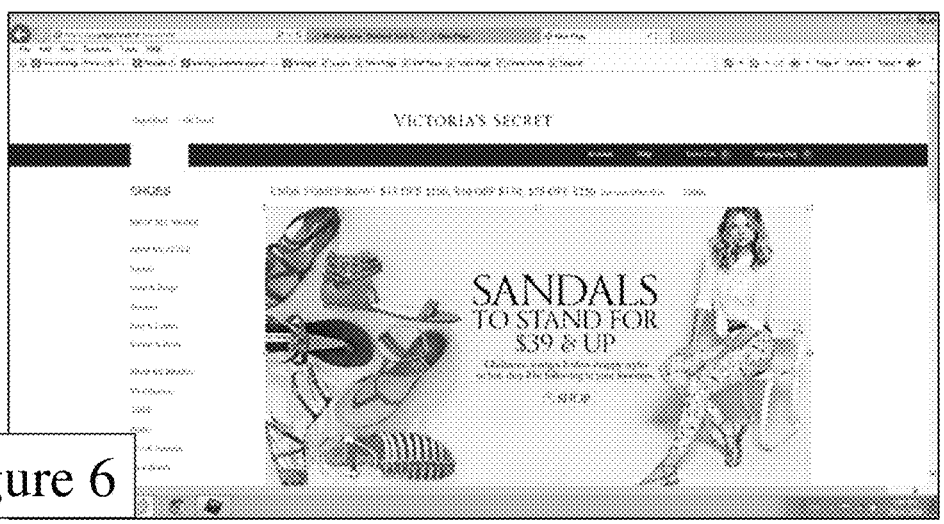

This process is similarly depicted in FIGS. 5 and 6 respectively where there are depicted first to third images 500A to 500C and fourth to sixth images 600A to 600C respectively in respect of a user exploiting a web based webpage editor/creator according to an embodiment to the invention. Such a web based webpage editor/creator representing an embodiment of a web content system and web content application/platform (WCS-WCAP) according to an embodiment of the invention. As depicted and described below the WCS-WCAP allows a user to copy a live webpage and/or website which may be a webpage and/or website of the user or it may alternatively be a third party webpage and/or website. In the latter instance the webpage and/or website may represent a format, layout that the user wishes to exploit. The WCS-WCAP when the user elects to copy the webpage and/or website and the assets, content and layout of that webpage and/or website are converted from their current source, e.g. hand coded HTML, content management system, etc., into a WYSIWYG drag and drop format for the user to work with.

Referring to FIG. 5 with first to third images 500A to 500C then the user logs into the WCS-WCAP as depicted in first image 500A, establishes a new blank webpage as depicted step 500B, and then accesses a webpage and/or website they wish to replicate in third image 500C, in this instance the splash page/home page of Victoria's Secret™. Next as depicted in fourth image 600A in FIG. 6 the user has selected copy, e.g. through a drop-down menu, CTRL+C, etc. as known in the art, where the WCS-WCAP begins analyzing the target webpage and/or website, and they are presented a status bar indicating progress of the replication process. Once, all elements have been analysed for the target webpage the WCS-WCAP presents fifth image 600B to the user. Selection of the "paste" button, e.g. through a drop-down menu, CTRL+V, etc. as known in the art, results in the WCS-WCAP generating the replica webpage and/or website on the blank page the user selected. Accordingly, this is displayed as sixth image 600C.

The processes described in respect of FIGS. 4A/4B and FIGS. 5/6 are based upon copying the result of a copy page operation within the WCS-WCAP onto a clipboard, which may be local and/or remote, and pasting it into a blank page on a website of the user. However, according to another embodiment of the invention the copy page operation deposits the copied page right into the user's site such that they are able to start directly editing or saving immediately.

Accordingly, a user upon visit any webpage on the Web may initiate a WCS-WCAP copy using the copy page algorithms. The WCS-WCAP then scans and analyzes every piece of content on the page including, but not limited to, text, images, movies, frames, third party widgets, colors, fonts, dimensions, layout, hover styles, Cascading Style Sheets (CSS), HTML, JavaScript, form elements, all external media, etc. The WCS-WCAP then converts each identified asset into a format suitable for drag and drop manipulation, by measuring its dimensions, visible attributes, positioning, etc. In order to address different web browser inconsistencies in rendering HTML/CSS, the WCS-WCAP will normalize the generated "code" it has produced for the webpage and/or website to be of a common format, which can be consistently rendered across PEDs and/or FEDs. In many instances, the inventors have established that their coded copy of the webpage and/or website is often more consistent with respect to being rendered on PEDs and/or FEDs than the original webpage and/or website code. Typically, the webpage and/or website reduces the page weight, often to half of the original byte size and number of elements, resulting in a simpler page architecture and faster page loading/rendering than the original. The result is a duplicate page that is rendered as absolutely or relatively positioned, suitable for use with a page editor other than the original production page editor.

The WCS-WCAP exploits a series of sophisticated algorithms which initially allow it to integrate with the chosen browser in order to extract runtime dimensions, attributes, positioning and other information, as well as data relating to "post" rendering by the browser versus analyzing the source code. However, simply "asking" the browser for each of these attributes and converting them will not yield a matching page. In fact, many combinations of stated attributes will not render the same content in the same way when lifted out of their original page context. This is due to many side effects and interactions between combinations of HTML/CSS attributes, that the WCS-WCAP's algorithms must compensate for to get a "what you see" version of all of the stated attributes, so they can be used to recreate the assets in the same form, in a different context, i.e. a new page. Initially, external assets such as images, videos, fonts, etc. for example, are "linked" into the resulting copied page and then, secondly, assets are duplicated, so that the copied page links to copied assets. In a third step, the first page can be "spidered" to find all linked pages, on or off the domain, and launch a subsequent copy page operation for each of those pages, thus copying an entire site. In this manner, the pages' internal links are re-written to point to the copied pages. Options for only spidering pages on the same domain, subdomain, with or without query string parameters can be specified.

Some advanced capabilities of the "copy" process, besides basic dimensions, visual attributes and position, etc. are z-index, masking of objects, 2D or 3D transformations, animations, etc. In an alternate configuration, the copy page operation can copy only a selected part of a page, either by drawing a rectangle to define a range of coordinates, or by selecting an element or group of elements on the page. Based on coordinates, WCS-WCAP will first measure all elements and find only those that overlap with the specified page region, and copy only those, also masking any objects that overlap the boundaries of the region. When using an element to specify a region, that element is first measured, converted to a region, and then copying proceeds as previous. This allows objects that may overlap the specified element but which are not child elements, to be copied and masked as well. The resulting copied pages or portions are serialized and are then portable allowing them to be posted to a server, copied to the clipboard, or saved in a file, or emailed, etc.

The WCS-WCAP algorithms, either in-browser or in-cloud, that analyze and de-construct the webpage content include, but are not limited to, algorithms to:

Analyse multiple inheritance of CSS by webpage elements and extract the parent CSS;
Measure absolute positions of webpage elements to determine location, width, height etc.;
Measure relative positions of webpage elements;
Identify and characterise floating elements within the webpage whose position is relative to other content dynamically inserted into the webpage;
Establish webpage element structure such as inline and/or flow layout.

Algorithms within the WCS-WCAP according to embodiments of the invention are arranged within a hierarchy so that lowest level algorithms analyse/extract webpage element information whilst those higher within the hierarchy manage aspects such as inheritance, flow, normalize webpage elements for multi-browser compatibility etc.

In many instances the analysis of elements and/or content is significantly more complete than simply requesting or "asking" the browser for dimensions of a webpage/screen element. For example, multiple inheritances of Cascading Style Sheets, variations of HTML coding practices, floating elements, browser inconsistencies and differing rendering box models, can all impact both the value provided by the browser in response to a request and what the true value actually is. Accordingly, the inventor has undertaken significant volumes of tests, observations etc. to codify various combinations of side effects in order to establish algorithms that can consistently extract and re-render webpage/website content the same way, using generic mark-up, across multiple browsers, operating systems, etc.

Figure 7:
FIGS. 7 and 8 depict exemplary screen images for a user using a web based webpage editor/creator according to an embodiment to the invention.
Figure 7:
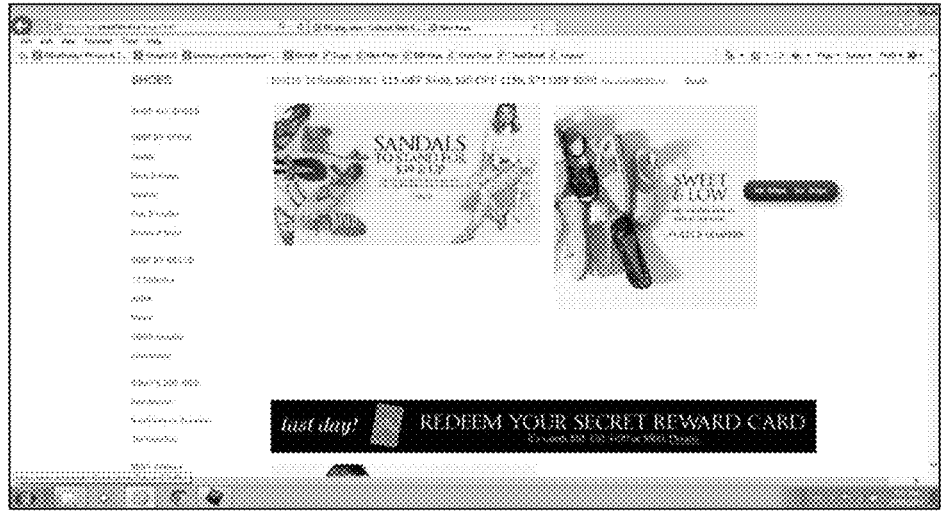
Figure 7:
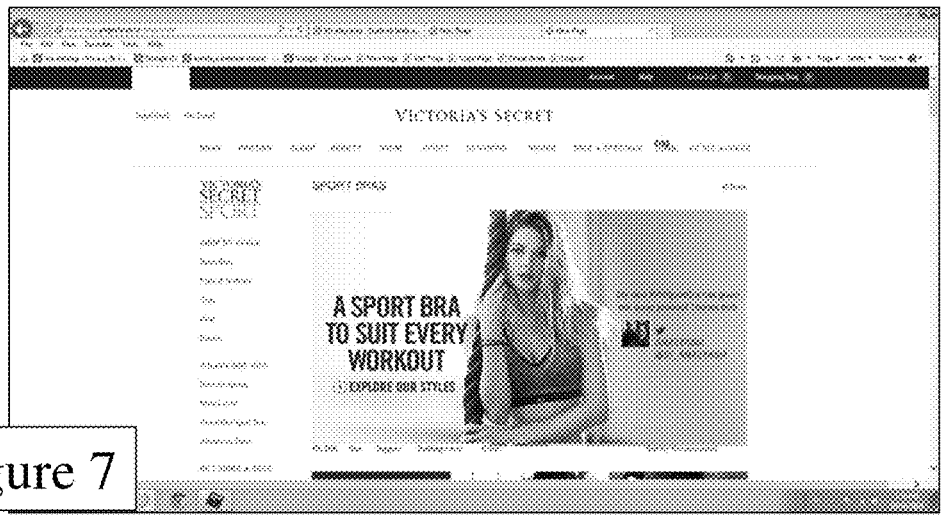
Figure 8:
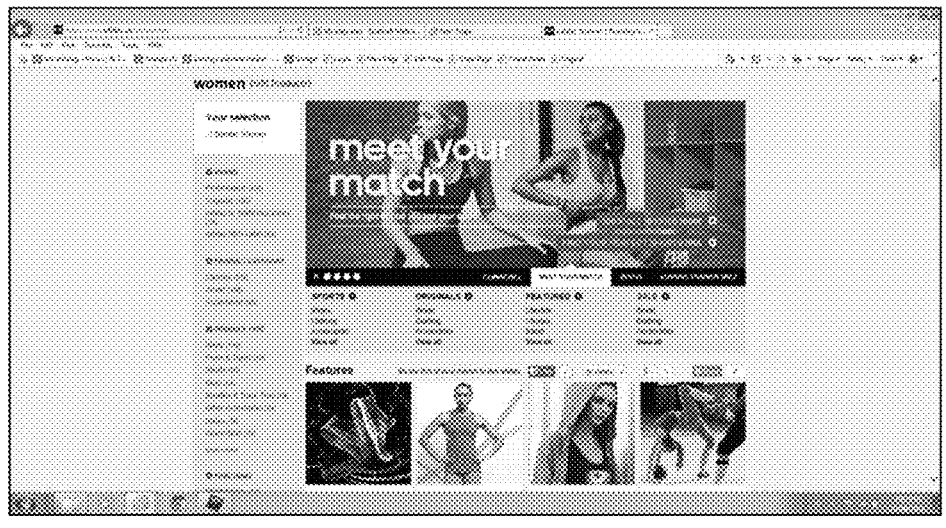
Figure 8:
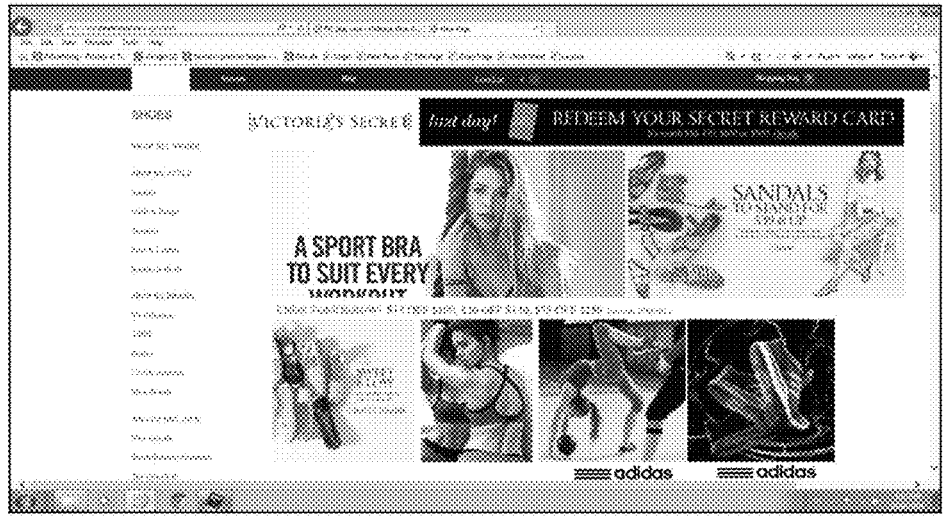
Figure 8:
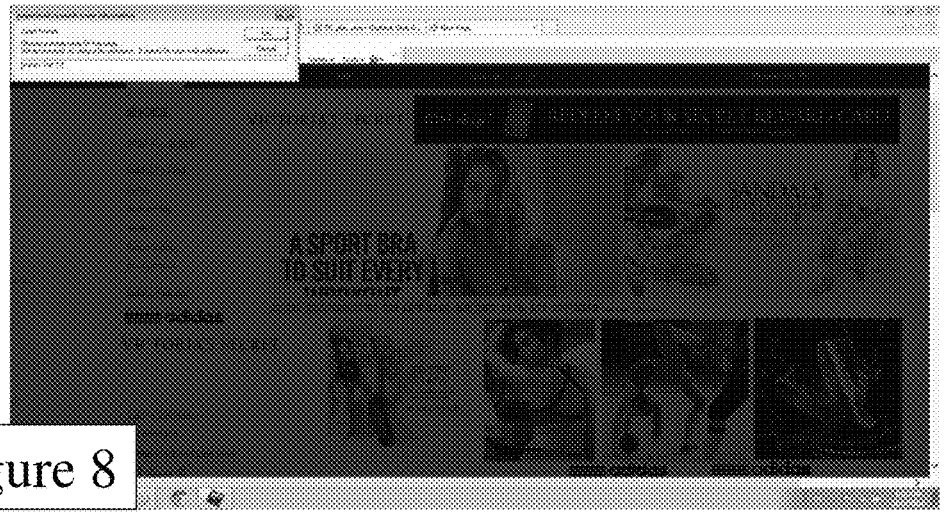

Accordingly once a user has replicated a webpage into their own website, either a discrete page or one of multiple pages, then they may proceed to work upon the webpage such as depicted in FIGS. 7 and 8 in steps 700A to 700F the user has:

Step 700A—the user has reduced the size of the main image from its original dimensions;
Step 700B—the user has moved the reduced original main image and moved/reduced a second image originally further down the webpage that was copied as part of the copy operation (i.e. the whole webpage is copied and not just the visible portion);
Step 700C—the user has moved to another webpage within the web site and copied this page;
Step 700D—the user has now moved to another web site, in this instance Adidas™ and copied this page;
Step 700E—the user has now copied content from each of the webpages copied in steps 700C and 700D and pasted it/resized it into the webpage of step 700B;
Step 700F—the user is saving the new webpage.

Drag and Drop Font Linking

This feature of the WCS-WCAP provides a user with the means for drag/drop and copy/paste integration of third party fonts with webpages.

The current state of third party fonts on the web is that there are many file formats that are each only supported on certain platforms, e.g. Windows, Mac, Linux, different browsers, etc. In order to "use" a third party font across different web browsers, a copy of each file format is required, and the appropriate code linkages, such as link tags, CSS declarations, Javascript loading, etc. are required. This collection of files, assembling of linkages and integration of the font codes into a web site/page are most often performed by a developer, by hand, or hard-coded into a pre-existing template or the application itself, in isolation.

However, according to embodiments of the invention the WCS-WCAP can receive a command to "integrate" with a third party font in several non-code ways including, but not limited to:

by dragging a single font file to a page;
by dragging/pasting a URL to a font in a font-repository;
pasting or dragging a URL or code representing the integration point for a third party font foundry; and
pasting a detectable font name, by naming convention, etc., e.g. font:funny-text.

When any of these actions occurs, the WCS-WCAP will determine what the name and properties of the font are, locate the font files, use a third party font-converter system to split the fonts into the most common formats, and then either copy the font files to its own repository and link to them, or link to the original sources in all formats, and instantly allow the font to be used in the page, with no coding required. Once a new font has been linked, copied, and split, the text editor is notified and the font now appears in the list of available fonts. An extra capability of a WCS-WCAP according to an embodiment of the invention is the ability to scan a page or part of a page, i.e. a copied widget, for currently unknown fonts. When unknown fonts are found, the WCS-WCAP scans third party repositories for a match, then initiates the copy and link mechanisms so the font becomes available for use.

Figure 9:
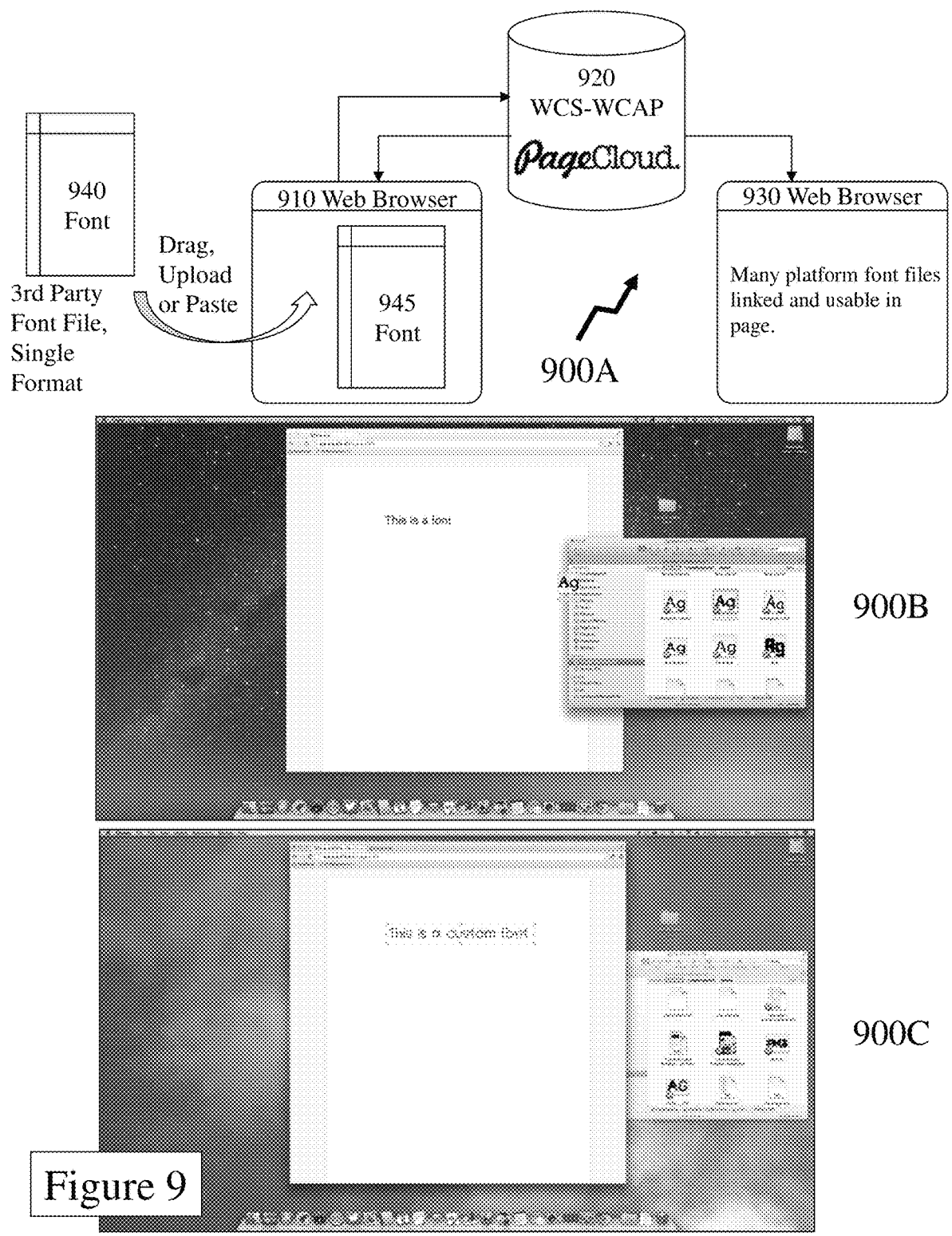
FIG. 9 depicts exemplary process and screen images for automatic font conversion and linking using a web based webpage editor/creator according to an embodiment to the invention.

Referring to FIG. 9 there are depicted exemplary process 900A and first and second screen images 900B and 900C respectively for automatic font conversion and linking using a web based webpage editor/creator according to an embodiment to the invention. As depicted in exemplary process 900A a user identifies a third party font file 940 which is then inserted into a first web browser 910, associated with or part of a WCS-WCAP 920, as inserted font 945. The WCS-WCAP 920 then converts the font file and splits it, either in-browser or in-cloud, into multiple platform formats liked to a document and text editor or multiple document and text editors. Accordingly, these are then accessible to the user within a second web browser 930, which may or may not be the same as first web browser 910. Accordingly, as depicted in first screen image 900B a user has selected a font from a font directory and is dragging the font onto a webpage that contains text. The WCS-WCAP process then after converting, splitting, and linking the split font files to a document and text editor yields a modified webpage in second screen image 900C wherein the font dragged is not associated to the content such that the displayed text now is formatted within the font.

Figure 10:
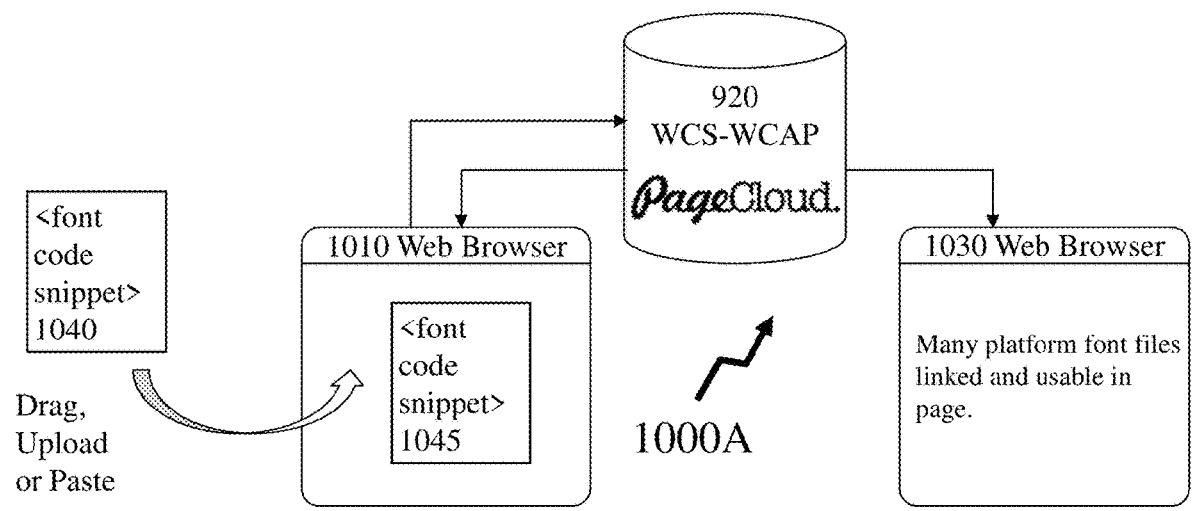
FIG. 10 depicts exemplary process and screen images for automatic font detection, acquisition, and linking using a web based webpage editor/creator according to an embodiment to the invention.
Figure 10:
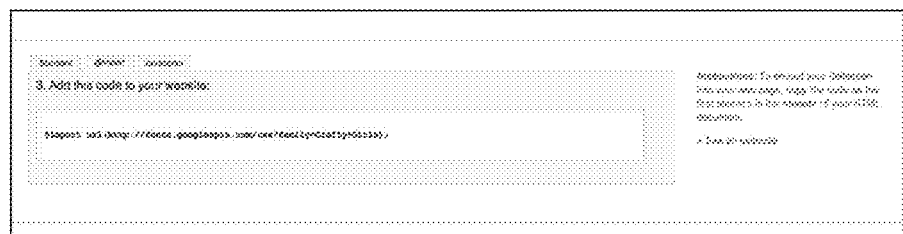
Figure 10:
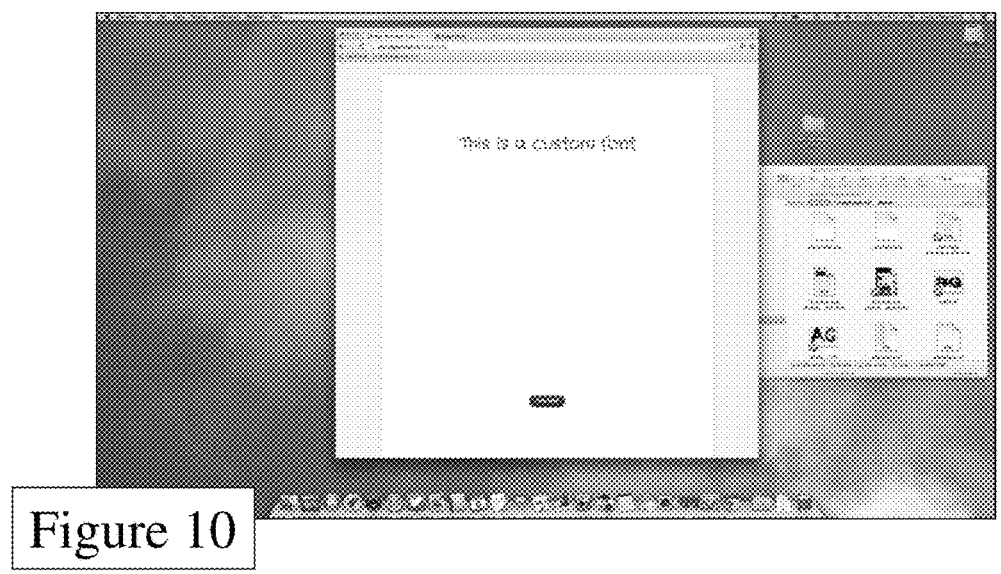

Referring to FIG. 10 there are depicted exemplary process 1000A, font text 1000B, and first screen image 1000C respectively for automatic font conversion and linking using a web based webpage editor/creator according to an embodiment to the invention. As depicted in exemplary process 1000A a user identifies a font code snippet 1040 which is then inserted into a first web browser 1010, associated with or part of a WCS-WCAP 920, as inserted font code snippet 1045. The WCS-WCAP 920 then executes a sequence of font detection, font search, and font procurement, either in-browser or in-cloud. Where this sequence yields a detected font which is found and procured then it is linked in HTML/CSS/Javascript (JS) formats for use across multiple platforms. These multiple platform font files are linked and then accessible within a second web browser 1030, which may or may not be the same as first web browser 1010. Accordingly, as depicted in font text 1000B a user has identified a font code snippet, in this case a URL relating to the font family "Crazy Girls" which once pasted into the WCS-WCAP results in first screen image 1000C wherein, after adding, the user is presented with an indication that a new font has been added document and text editor which has been employed such that the displayed text now is formatted within the font.

Browser Inspector Persistence

This feature of the WCS-WCAP provides a user with a means to "save" the changes that a user makes in the browser's web inspector, so that they become permanent and the next time they or anyone else loads the webpage, those changes persist.

Within developer forums on the Web a means to "save" their changes in the web inspector has been a request for years, but at present is not feasible. This has not been technically feasible because the "webpage" that is sent down to the web browser was just-in-time compiled by a content management system or application server. If the changes were then "sent back" to the server but the server cannot reversibly deconstruct those changes and update its source files. Accordingly, the current state of the art with respect to webpage construction is one-way. In contrast WCS-WCAPs according to embodiments of the invention provide an architecture which is novel in that the user is always interfacing with an operating upon the "document" as it exists on the server as well. Accordingly, when a user makes a change to a webpage/website/document they make changes to the document object model (DOM) on the client device, i.e. their web browser, and saves that page, then the changes are sent back to the server and saved inside the page.

Within an embodiment of the invention, the entire webpage exists as a single HTML file on the server. However, optionally, parts of the HTML page may be marked as "sub-templates" and these markings serve as instructions for the server to be able to receive the document from the browser and split the content back again into its template parts. Alternatively, the page areas, e.g. header, footer, navigation bar, body, etc., are persisted as a single document/file whilst in another embodiment of the invention these are split into distinct "templates" so that these can be integrated with other third party content management system.

Additionally, most attributes and properties (styles) of elements are stored in the style attribute of the element or in a unique matching CSS rule with a one-to-one relationship to each element, so that changes to styles do not have to be "inherited" across other incidental elements. The result is that transfer of the page is bidirectional, from the server down to the client, and from the client back up to the server for saving, by making use of the web inspector as a form of advanced editor. Beneficially, exploiting a web inspect exposes a code console, so that more than the WCS-WCAP user interface can be used alongside the DOM inspector to modify pages, wherein immediate code can be written inside the code console to modify the page, and call any exposed WCS-WCAP library functions, so that those changes persist when the page is saved and sent back to the server. Another way of viewing this is that within the prior art a webpage is simply a one-way projection of the original parts whilst within a WCS-WCAP according to embodiments of the invention the webpage is the real document itself and hence edits made to the version upon the webpage are edits upon the real document which is saved to the remote WCS-WCAP either immediately, periodically, or upon an event occurring.

Figure 11:
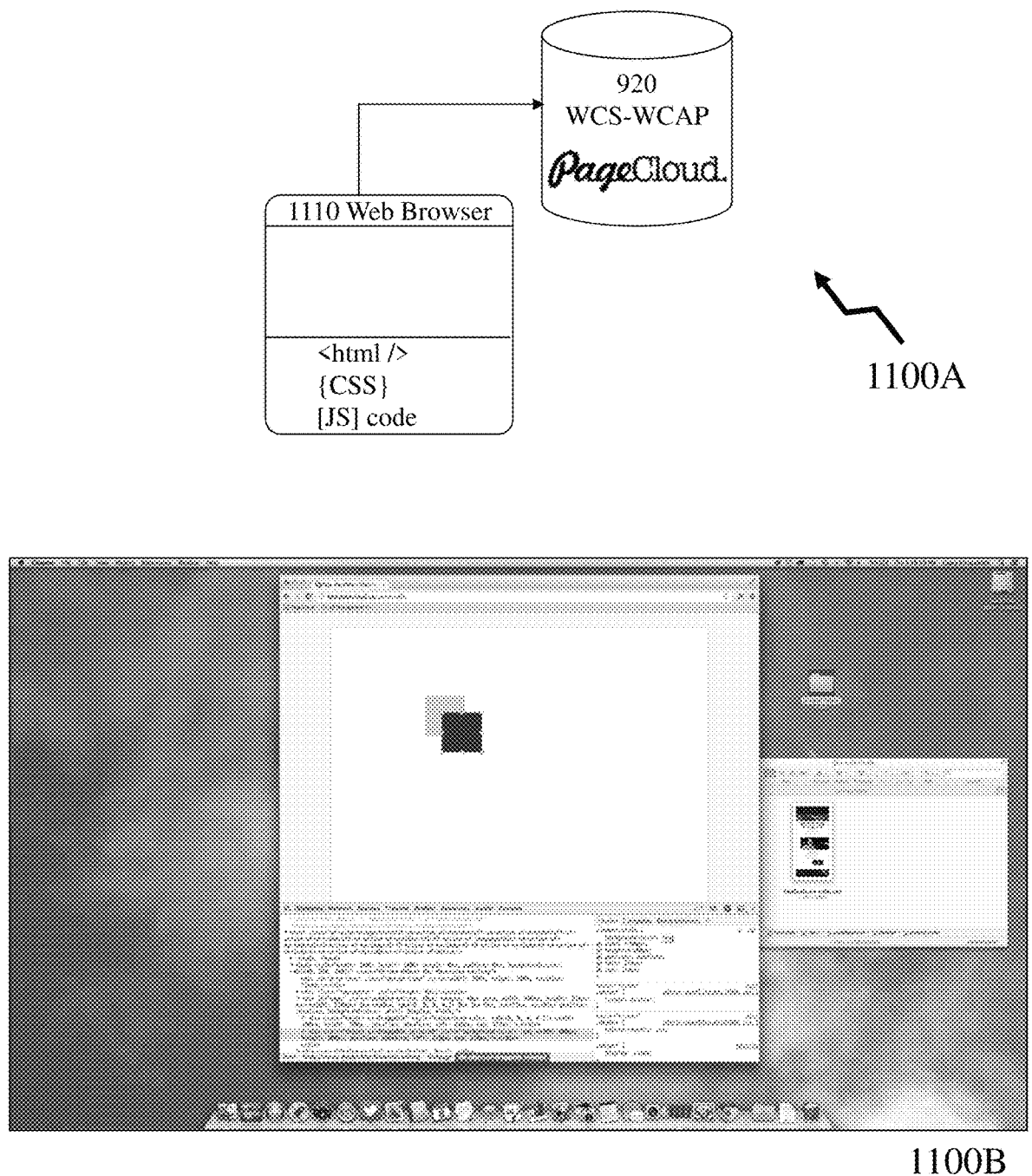
FIG. 11 depicts exemplary process and screen images relating to web-inspector code persistence via a web based webpage editor/creator according to an embodiment to the invention.

Referring to FIG. 11 there are depicted exemplary process 1100A and screen image 1100B respectively relating to web-inspector code persistence via a web based webpage editor/creator according to an embodiment to the invention. As depicted a user adds, edits, removes, deletes code (e.g. HTML, CSS, JS, etc.) using Web Inspector, to see changes live within the web browser 1110 they are working within/upon in association with WCS-WCAP 920. The user may use the Web Inspector console to run code that modifies the document where these code changes are then sent to the server upon which the WCS-WCAP is in execution for saving. Accordingly, referring to screen image 1100B the user is editing the colour of the element within the Web Inspector such that its background colour is now red.

Drag and Drop Conversion of Proprietary Format to Webpage

This feature of the WCS-WCAP provides a means for expanding an external file format, often a proprietary file format, into an object or full webpage, by dragging the file expressed in the external file format into the browser or alternatively pasting it from a clipboard. Most notably, Adobe Photoshop (with its proprietary file format and .psd file extensions) or other such programs including, but not limited to, Pixelmator, PowerPoint, Word, Excel, Keynote, Numbers, and Pages.

A variety of file formats may be dragged into the browser or pasted from the clipboard. Some of those basic formats include, but are not limited to, comma-separated values (CSV), text, and other micro formats. These can be interpreted directly by WCS-WCAPs according to embodiments of the invention through their client libraries such that they are converted into HTML objects, such as tables, text objects, etc. for example. In the instances of more complex and typically visual file formats, like Photoshop, these are sent to the server for advanced deconstruction and conversion to HTML/CSS/Javascript. In the case of Photoshop or other similar formats, the file contains multiple layers of graphic pieces, text pieces, and metadata (e.g. layer names, dimensions, positions, etc.). These file formats can be read on the server, split out into matching HTML elements/objects, and then sent back down to the client in WYSIWYG form. The net effect is, that by dragging or cut/copy pasting a file into a web browser, which within a short timeframe, typically seconds, the file is replaced with an instantly coded webpage, comprising all the layers in the Photoshop file, rather than a single image. Accordingly, text is text, images are layers. Using naming conventions and metadata, other signals can be embedded in the PSD file. For example, naming a layer "Link to: Contact.psd", the link-to could be considered an instruction, to search for a matching file name or URL, and create a hyperlink to that page.

Figure 12:
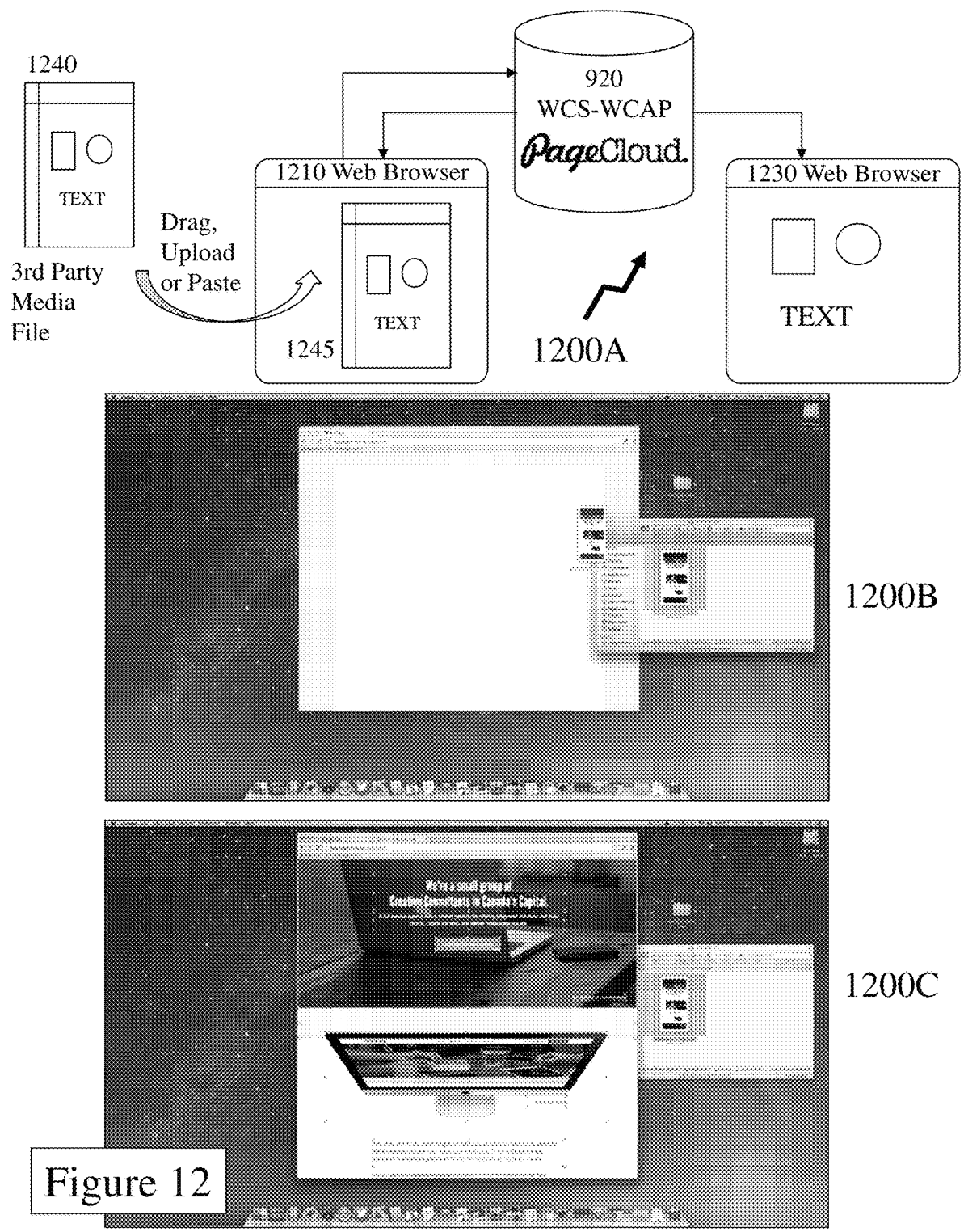
FIG. 12 depicts exemplary process and screen images for converting third party media to webpages via a web based webpage editor/creator according to an embodiment to the invention.

Now referring to FIG. 12 there are depicted exemplary process 1200A and first/second screen images 1200B and 1200C respectively for converting third party media to webpages via a web based webpage editor/creator according to an embodiment to the invention. As depicted in exemplary process 1200A a user identifies a third party media file 1240 which is then inserted into a first web browser 1210, associated with or part of a WCS-WCAP 920, as inserted third party media file 1245. This insertion may, for example, be via dragging, uploading and copy-paste operations. The WCS-WCAP 920 then executes media conversion, either in-browser or in-cloud, resulting in the third party media being split into HTML/CSS/Javascript (JS) documents that are then inserted into the second web browser 1030, which may or may not be the same as first web browser 1010. Accordingly, in first screen image 1200B a user is dragging a third party media file from a folder onto a webpage. Once the WCS-WCAP processing has been completed then the third party media file is now displayed as content within the webpage as depicted in second screen image 1200C wherein the individual elements within the content are now individually selectable, editable, adjustable, etc.

Widget Creation

This feature according to embodiments of the invention provides a means for creating third party "widgets" on a webpage. Such "widgets", which are a generic type of software application comprising portable code intended for one or more different software platforms, may include, but not be limited to, video players, Twitter™ buttons, Flickr™ photo sets, embedded forms, maps, e-commerce widgets, checkouts, carts, etc. These are created by pasting certain text or objects into the browser. For example; pasting the URL associated with YouTube™ video into a webpage created by a WCS-WCAP according to an embodiment of the invention results in the creation of a player for that video.

Within the prior art many software applications support third party widgets which are embeddable to webpages. However these are generally "created" by invocation of a "create this kind of widget" feature within an application, i.e. add a video widget and then link the content it. In contrast, embodiments of the invention for WCS-WCAPs start with the content to be presented and invoke the application to create the appropriate widget based upon the content type. Hence, in the prior art adding a YouTube™ widget is through the process of creating the YouTube™ within the webpage and then filling out the form with the URL of the video file. However, a user exploiting a WCS-WCAP according to an embodiment of the invention will provide the URL of the content and the WCS-WCAP determines what widget to create and how to do it. Typically, there are four main variations:

paste or drag a URL to a known third party service or asset type, for example a URL to an image or to Facebook fan page;

paste a snippet of code, usually provided by the third party to create a widget;

paste or drag a uniquely recognizable text string, for example: Google Analytics tracking identity (a UA ID); or paste or drag a URL or piece of code that is not recognized, for anonymous integration (such as through iframe or sandbox for example) or automatic type detection/inference.

As a result, a WCS-WCAP according to an embodiment of the invention may go spider the page looking for indicators of widget/page type. After any of the proceeding variations, or others, have occurred the WCS-WCAP will look up any matches from a set of known widget types. The necessary metadata will be extracted from whatever is passed, i.e. from the URL, the snippet of code, the unique token, or the spidered page, such as IDs. With the widget type and IDs, a new widget of that type can be created, so that code injection is not possible; and the widget is added to the page. A variation of this is that there are some standard "unknown/anonymous" formats allowed, such as any iFrame (where no match is required). Accordingly, widget creation may be clipboard based or drag and drop based.

Figure 13:
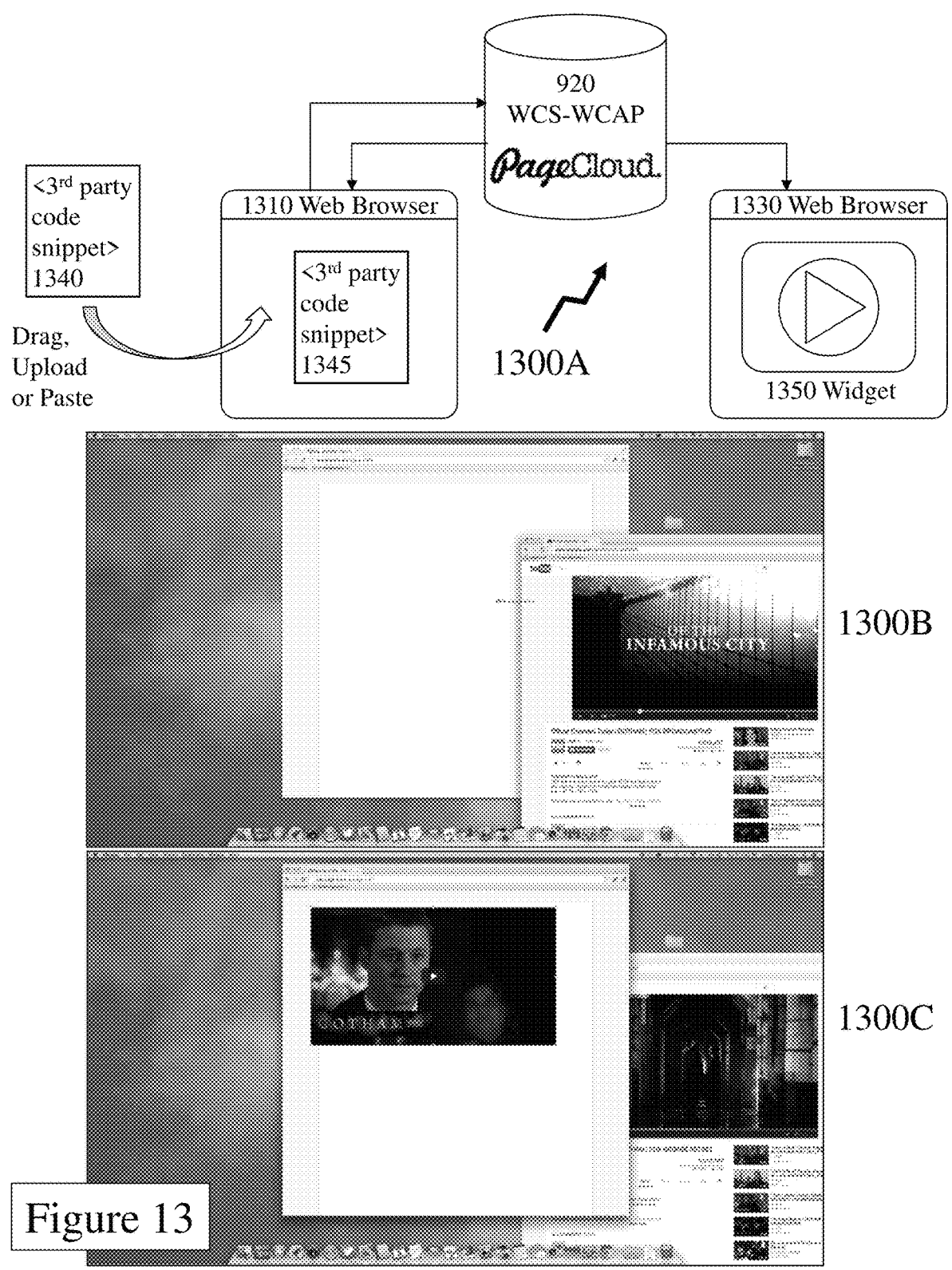
FIG. 13 depicts exemplary process and screen images for an interaction-driven widget creation process via a web based webpage editor/creator according to an embodiment to the invention.

Now referring to FIG. 13 there are depicted exemplary process 1300A and first/second screen images 1300B and 1300C respectively for an interaction-driven widget creation process via a web based webpage editor/creator according to an embodiment to the invention. As depicted in exemplary process 1300A a user identifies a third party code snippet 1340 which is then inserted into a first web browser 1310, associated with or part of a WCS-WCAP 920, as inserted third party code snippet 1345. This insertion may, for example, be via dragging, uploading and copy-paste operations. The WCS-WCAP 920 then executes a widget signature detection and instantiation process, either in-browser or in-cloud, resulting in the widget being instantiated in the proper form based upon its detected signature and media links. This results in the insertion of widget 1350 into the second web browser 1330, which may or may not be the same as first web browser 1310. Accordingly, in first screen image 1300B has navigated to YouTube™ and a trailer for a movie, e.g. Gotham. The user is dragging this third party media file, i.e. Gotham video trailer, from YouTube™ onto another webpage. Once the WCS-WCAP processing has been completed then the third party media file, i.e. Gotham video trailer, is now displayed as a widget within the webpage as depicted in second screen image 1300C such that selection of the widget, in this instance, results in the third party media file, namely the Gotham video trailer, being played within the webpage.

Browser to Operating System Clipboard Communication

This feature according to embodiments of the invention makes use of the operating system (OS) clipboard allowing for not only basic copy/cut/paste operations within a single browser or tab of a web browser, but also across browsers, across multiple tabs of a web browser, across different applications, and even across Virtual Machines.

Within the prior art most web applications do not support a clipboard for anything except copying text from form fields. Some more advanced web applications implement their own pseudo clipboard, as separate from the Operating System clipboard, to mimic cut/copy/paste within a single webpage. However, there are severe limitations to this approach, including:

inability to copy "objects" from one tab of a web browser to another, even if both web browser tabs are the same web application;

inability to cut/copy/paste from other desktop or web applications to/from the one you are using;

inability to paste "unknown" data types (example: raw images from the clipboard or objects from other apps); and inability to be invoked by native operating system (OS) controls such as pull-down menus, context menus, native browser controls (buttons), for example.

However, WCS-WCAPs according to embodiments of the invention provide a mechanism that addresses and solves all of these limitations. When a cut/copy operation occurs, the data goes to the operating system clipboard with the WCS-WCAP rather than an internal fake clipboard of a prior art application. This allows WCS-WCAP objects and content to be pasted to third party applications, such as email, instant messenger, text editors, etc. Accordingly, the WCS-WCAP clipboard and objects are "portable". Accordingly, a user may copy some objects to the clipboard, paste them into an email, send it to a friend, have them copy the code and paste it into another WCS-WCAP webpage. Additionally, a WCS-WCAP can receive foreign objects when pasting from the OS clipboard. If a data type is not known, i.e. not an image or text, then the content is first converted to an image by the operating system, and then picked up by the WCS-WCAP and pasted as an image object. If text, the pasted content is scanned for known micro-formats, such as CSV, URLs, HTML, or native WCS-WCAP objects.

Figure 14:
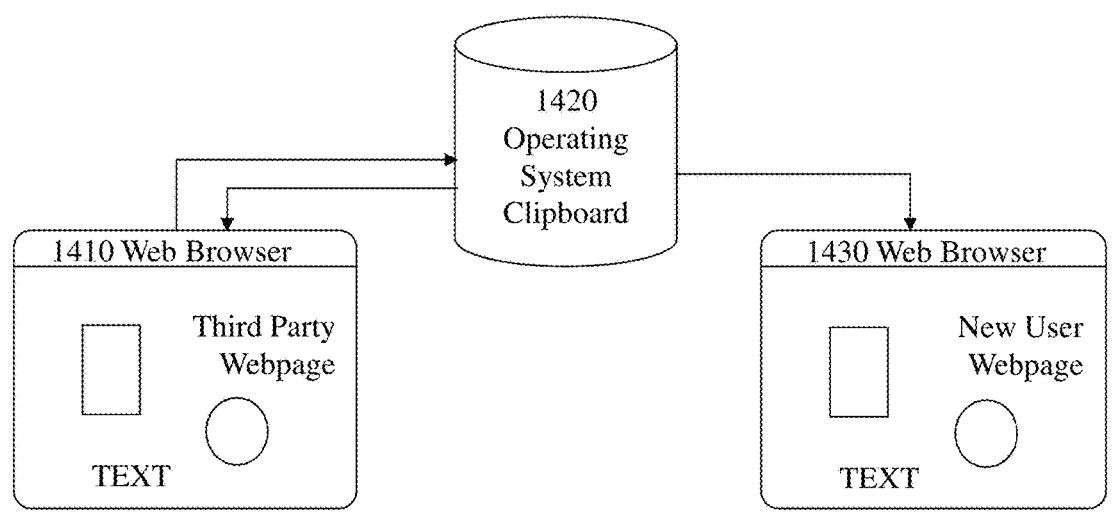
FIG. 14 depicts exemplary process and screen images for a web-browser to operating system clipboard relaying via a web based webpage editor/creator according to an embodiment of the invention.
Figure 14:
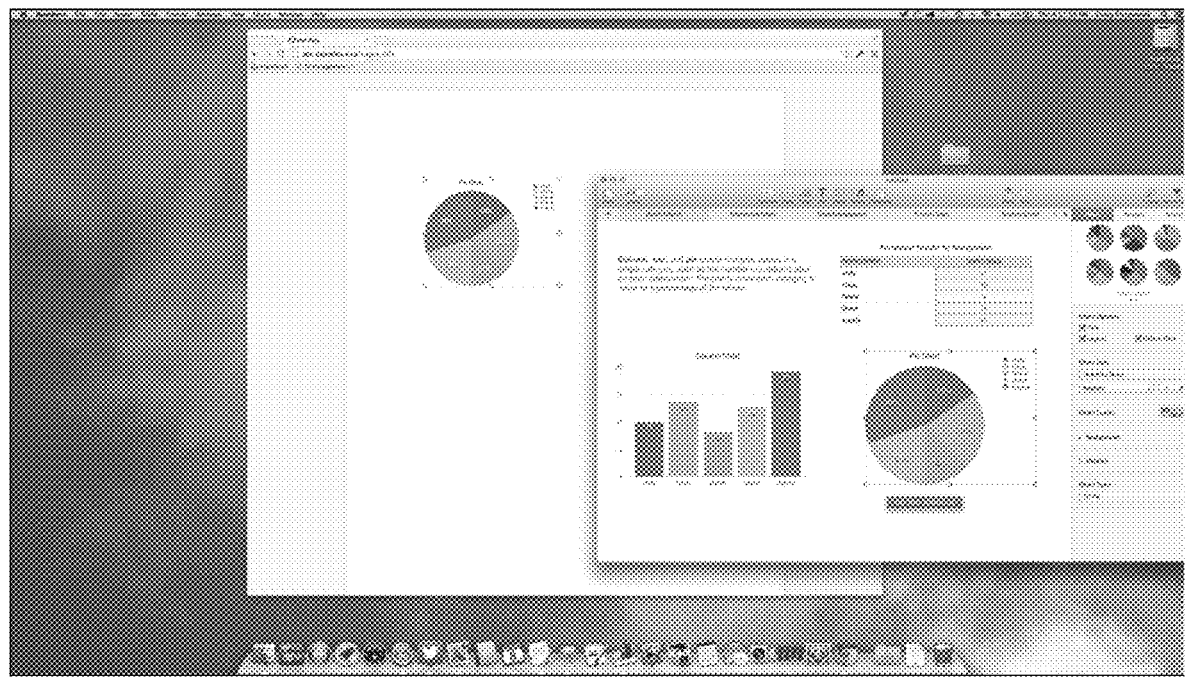

Referring to FIG. 14 there are depicted exemplary process 1400A and screen image 1400B respectively for a web browser to operating system (OS) clipboard relaying function via a web based webpage editor/creator according to an embodiment to the invention. Accordingly, as depicted in exemplary process 1400A a first web browser 1410 is depicted upon which the user is accessing a third party webpage. Accordingly, upon triggering of a web browser to OS clipboard relying function by the user the WCS-WCAP converts impacted native objects to a microformat and selects these (i.e. by their association selects the content) ready for the OS clipboard prior to giving the user control through a copy or cut selection (e.g. through a drop-down menu or through CTRL+C/CTRL-X). The microformatted objects are then stored within the OS clipboard wherein the user subsequently elects to paste them (e.g. through a drop-down menu or through CTRL+V) wherein after the initial pasting the WCS-WCAP decodes the native objects from their microformat instantiations. At this point any third party media files within the cut/copy process are similarly converted to native objects or widgets such as described supra. Accordingly, a user in screen image 1400B has selected an item, e.g. by selecting the item or establishing a selection box around it as known within the art, within a document, in this instance a pie chart, and copied-pasted this into a webpage wherein the pie chart is instantiated as an editable object.

Portable Page Slices and Objects within Collaborative Webpage Generation

With this feature, which may potentially be considered as a subset or breakout of browser to operating system clipboard described supra. As objects may be extracted, copied and pasted into an email, sent to a third party, and then extracted/pasted to a webpage then multiple users may create content for a single webpage which is then collated by a user to generate the webpage. As such a webpage can be generated through a collaborative team communicating through email or instant messenger in parallel to webpage development allowing a single controlled webpage to be established/maintained with content provided from users distributed locally, regionally, or internationally.

Figure 15A:
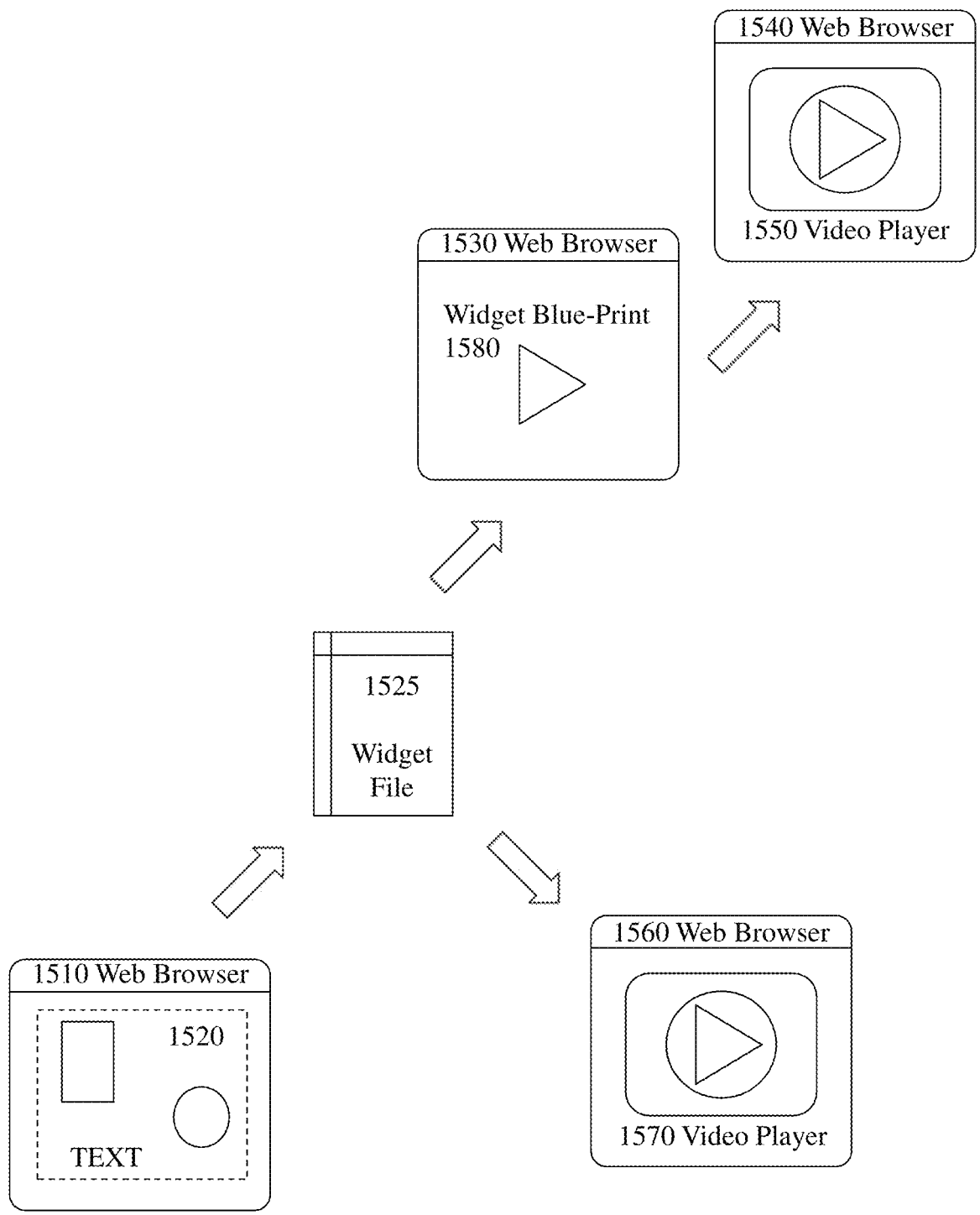
FIGS. 15A and 15B depict exemplary process and screen images for portable HTML object re-instantiation via a web based webpage editor/creator according to an embodiment to the invention.
Figure 15B:
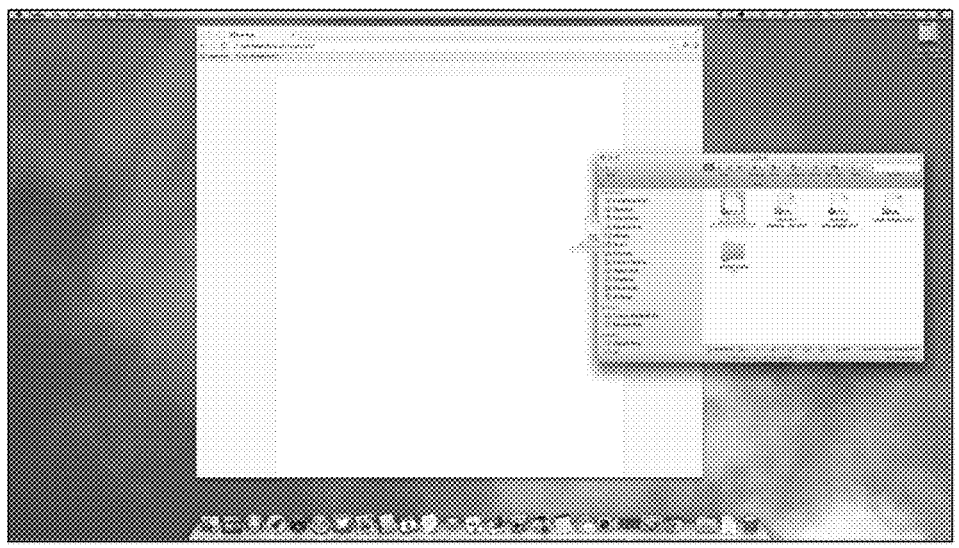
Figure 15B:
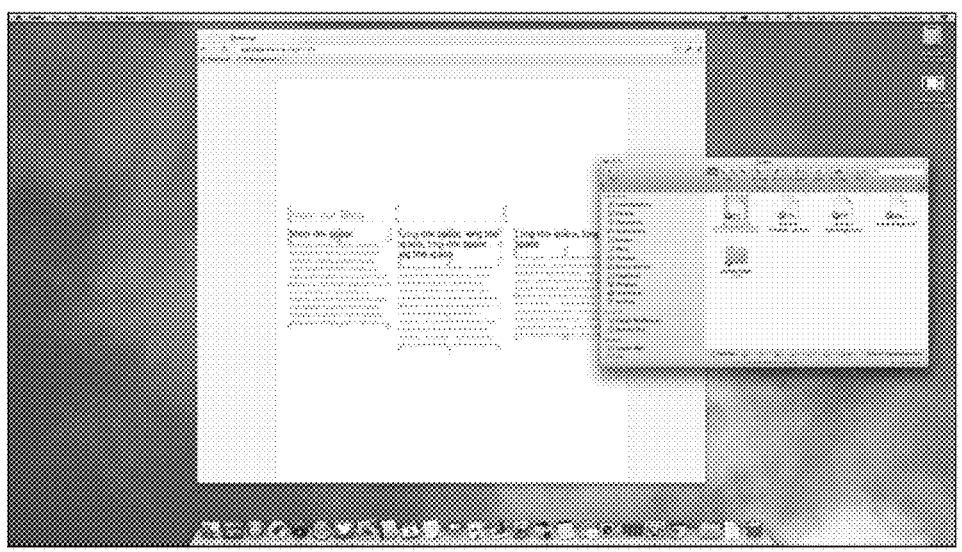

FIGS. 15A and 15B depict exemplary process 1500A and first/second screen images 1500B and 1500C respectively for portable HTML object re-instantiation via a web based webpage editor/creator according to an embodiment to the invention. Accordingly, a user selects content within a first web browser 1510 which is copied to the OS clipboard and then pasted into a file, e.g. widget file 1525, for saving. At this point the user may be inserted, e.g. by dragging, uploading, or pasting, back into a second web browser 1560 wherein it is re-instantiated. In this example, it is re-instantiated as first video player 1570. Alternatively, the widget file 1525 may be inserted into a third web browser 1530 as widget blue-print 1580, e.g. e.g. by dragging, uploading, or pasting. The widget blue-print 1580 may then be copied or dragged to another browser window, e.g. fourth web browser 1540, wherein it is re-instantiated as second video player 1550. Accordingly, in first screen image 1500B a user has selected a document, e.g. an HTML document, within a folder and is dragging this onto a web page wherein the WCS-WCAP process results in the HTML document, which in this instance was a blog, being re-instantiated as content within the webpage.

Intra-Session Versioning on the Web

This feature, also referred to by the inventor as persistent undo/redo, relates to a feature with a WCS-WCAP according to embodiments of the invention allowing for the storage and retrieval of "versions" of a webpage between save operation.

Within some prior art content management systems there is provision for versioning of page content, e.g. via a database or flat file system. Every time a "save" occurs, these prior art systems keep old copies and manage the version numbers. However, a WCS-WCAP according to an embodiment of the invention supports an undo/redo manager wherein every change made to a webpage is serialized as text differences. These text differences may then be stored as versions of that page, at each save. Accordingly, in contrast to prior art content management systems for webpages the WCS-WCAP version control system may not only can roll back to a saved "file" version, but it can access all the serialized differences between saves. Accordingly, a user may, in essence, reverse through every single edit ever made to a page, since it was created, whether or not those changes were consciously "saved" at that time.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of instantiating a feature within a web based application comprising:
    providing a server connected to a communications network comprising a first microprocessor and a first memory for storing first computer executable instructions for execution by the first microprocessor;
    providing an electronic device connected to the communications network comprising a second microprocessor and a second memory for storing second computer executable instructions for execution by the first microprocessor; wherein
    the first computer executable instructions and the second computer executable instructions provide a user of the electronic device with the ability to instantiate the feature within the web based application upon the electronic device with respect to one or more items of web content employing processes upon the server;
    the feature instantiated is the generation of a first webpage comprising What-You-See-Is-What-You-Get (WYSIWYG) directly editable content from a second webpage; and
    the feature is instantiated with a process comprising:
        opening the second webpage within the web based application within a web browser;
        processing every piece of content of the second webpage opened within the web based application upon the server to establish a plurality of identified assets, each identified asset rendered as part of the second webpage;
        processing upon the server each identified asset of the plurality of identified assets with a plurality of copy page algorithms to convert the identified asset from its current source to establish a converted asset within the web based application having the formatting and visible characteristics of the original identified asset where each converted asset is normalized to a common format providing consistent rendering across multiple electronic devices and multiple web browsers;
        establishing within the web based application one or more actions of the user which result in copying a predetermined portion of the plurality of converted assets;
        establishing within the web based application one or more further actions of the user which result in pasting or directing the copied predetermined portion of the plurality of converted assets to generate the first webpage within the web based application;
        manipulating directly within the web based application in dependence upon other user actions within the web based application of the user upon one or more pasted or directly copied converted assets of the plurality of converted assets where the user action is at least one of edit, resize, move, copy, paste, and delete;
        storing the first webpage within a memory of the server; wherein
        the plurality of copy page algorithms are arranged in a hierarchy with lowest level algorithms process the second webpage to extract webpage element information and highest level algorithms extract a structure of the second webpage structure comprising inheritance and flow together with normalizing the extracted webpage elements to the common format;
        the plurality of copy page algorithms include copy page algorithms to:
            analyse multiple inheritance of Cascading Style Sheets (CSSs) for the extracted webpage elements and extract the parent CSS;
            measure absolute positions of extracted webpage elements to establish their location, width, and height;
            measure relative positions of extracted webpage elements;
            identify and characterise floating elements within the second webpage whose position is relative to other content dynamically inserted into the second webpage; and
            establish a structure of the extracted webpage elements relating to at least one of inline layout and flow layout; and
        the predetermined portion of the plurality of converted assets within the second webpage stored in memory are independent of the plurality of identified assets within the second webpage.

2. A method of instantiating a feature within a web based application comprising:
    providing a server connected to a communications network comprising a first microprocessor and a first memory for storing first computer executable instructions for execution by the first microprocessor;
    providing an electronic device connected to the communications network comprising a second microprocessor and a second memory for storing second computer executable instructions for execution by the first microprocessor; wherein
    the first computer executable instructions and the second computer executable instructions provide a user of the electronic device with the ability to instantiate the feature within the web based application upon the electronic device with respect to one or more items of web content employing processes upon the server;
    the feature instantiated is the generation of a first website comprising What-You-See-Is-What-You-Get (WYSIWYG) directly editable content from a second website; and
    the feature is instantiated with a process comprising:
        opening the second webpage within the web based application within a web browser;
        processing every piece of content of the second webpage opened within the web based application upon the server to establish a plurality of identified assets, each identified asset rendered as part of the second webpage;

processing upon the server each identified asset of the plurality of identified assets with a plurality of copy page algorithms to convert the identified asset from its current source to establish a converted asset within the web based application having the formatting and visible characteristics of the original identified asset where each converted asset is normalized to a common format providing consistent rendering across multiple electronic devices and multiple web browsers;

establishing within the web based application one or more actions of the user which result in copying a predetermined portion of the plurality of converted assets;

establishing within the web based application one or more further actions of the user which result in pasting or directing the copied predetermined portion of the plurality of converted assets to generate the first webpage within the web based application;

manipulating directly within the web based application in dependence upon other user actions within the web based application of the user upon one or more pasted or directly copied converted assets of the plurality of converted assets where the user action is at least one of edit, resize, move, copy, paste, and delete;

storing the first webpage within a memory of the server; wherein processing each piece of content of the second webpage includes automatically identifying external assets within the plurality of identified assets each identifying another webpage linked to the second webpage and sequentially processing a subset of the identified external assets to establish a second plurality of identified assets and executing the plurality of copy page algorithms upon the second plurality of identified assets in dependence upon an option set within the web based application; and the option specifies that the subset of the identified external assets is one of all other webpages linked to the second webpage, only those other webpages on a same domain as the second webpage, only those other webpages on a same subdomain as the second webpage, only those webpages comprising query string parameters, and only those webpages without query string parameters.

3. A method of instantiating a feature within a web based application comprising:

providing a server connected to a communications network comprising a first microprocessor and a first memory for storing first computer executable instructions for execution by the first microprocessor;

providing an electronic device connected to the communications network comprising a second microprocessor and a second memory for storing second computer executable instructions for execution by the first microprocessor; wherein the first computer executable instructions and the second computer executable instructions provide a user of the electronic device with the ability to instantiate the feature within the web based application upon the electronic device with respect to one or more items of web content employing processes upon the server;

the feature instantiated is the generation of a first webpage comprising What-You-See-Is-What-You-Get (WYSIWYG) directly editable content from a second webpage and its electronic transmission to a second user for generating a third webpage; and the feature is instantiated with a process comprising:

opening the second webpage within the web based application within a web browser;

processing every piece of content of the second webpage opened within the web based application upon the server to establish a plurality of identified assets, each identified asset rendered as part of the second webpage;

processing upon the server each identified asset of the plurality of identified assets with a plurality of copy page algorithms to convert the identified asset from its current source to establish a converted asset within the web based application having the formatting and visible characteristics of the original identified asset where each converted asset is normalized to a common format providing consistent rendering across multiple electronic devices and multiple web browsers;

establishing within the web based application one or more actions of the user which result in copying a predetermined portion of the plurality of converted assets;

establishing within the web based application one or more further actions of the user which result in pasting or directing the copied predetermined portion of the plurality of converted assets to generate the first webpage within the web based application;

manipulating directly within the web based application in dependence upon other user actions within the web based application of the user upon one or more pasted or directly copied converted assets of the plurality of converted assets where the user action is at least one of edit, resize, move, copy, paste, and delete;

storing the first webpage within a memory of the server; and establishing within the web based application a determination by the user to transmit the pasted or copied predetermined portion of the plurality of converted assets in an electronic message as portable webpage content within an electronic message to another user; wherein the second user copies the portable webpage content within the electronic message within another web based application upon another electronic device and pastes the copied portable webpage content to generate a third webpage which is then stored within the memory of the server.

4. A method of instantiating a feature within a web based application comprising:

providing a server connected to a communications network comprising a first microprocessor and a first memory for storing first computer executable instructions for execution by the first microprocessor;

providing an electronic device connected to the communications network comprising a second microprocessor and a second memory for storing second computer executable instructions for execution by the first microprocessor; wherein the first computer executable instructions and the second computer executable instructions provide a user of the electronic device with the ability to instantiate the feature within the web based application upon the electronic device with respect to one or more items of web content employing processes upon the server;

the feature instantiated is the generation of a first webpage comprising What-You-See-Is-What-You-Get (WYSIWYG) directly editable content from a second webpage and providing sequential undo or redo rendering of subsequent changes made to the first webpage; and the feature is instantiated with a first process and a second process wherein:

the first process comprises:

opening the second webpage within the web based application within a web browser;

processing every piece of content of the second webpage opened within the web based application upon the server to establish a plurality of identified assets, each identified asset rendered as part of the second webpage;

processing upon the server each identified asset of the plurality of identified assets with a plurality of copy page algorithms to convert the identified asset from its current source to establish a converted asset within the web based application having the formatting and visible characteristics of the original identified asset where each converted asset is normalized to a common format providing consistent rendering across multiple electronic devices and multiple web browsers;

establishing within the web based application one or more actions of the user which result in copying a predetermined portion of the plurality of converted assets;

establishing within the web based application one or more further actions of the user which result in pasting or directing the copied predetermined portion of the plurality of converted assets to generate the first webpage within the web based application;

manipulating directly within the web based application in dependence upon other user actions within the web based application of the user upon one or more pasted or directly copied converted assets of the plurality of converted assets where the user action is at least one of edit, resize, move, copy, paste, and delete; and storing the first webpage within a memory of the server; and the second process comprises:

serializing every change made to the first webpage as a result of a user action within the web based application as a text difference;

storing the text differences and the first webpage within the memory of the server;

opening the first webpage within another web browser; and allowing another user through the another web browser to sequentially move through the serialized changes in either direction as undo or redo operations and rendering for each serialized change in either direction a third webpage established in dependence upon the first webpage and the stored text differences; wherein the plurality of copy page algorithms are arranged in a hierarchy with lowest level algorithms process the second webpage to extract webpage element information and highest level algorithms extract a structure of the second webpage structure comprising inheritance and flow together with normalizing the extracted webpage elements to the common format;

the plurality of copy page algorithms include copy page algorithms to:

analyse multiple inheritance of Cascading Style Sheets (CSSs) for the extracted webpage elements and extract the parent CSS;

measure absolute positions of extracted webpage elements to establish their location, width, and height;

measure relative positions of extracted webpage elements;

identify and characterise floating elements within the second webpage whose position is relative to other content dynamically inserted into the second webpage; and establish a structure of the extracted webpage elements relating to at least one of inline layout and flow layout.

\* \* \* \* \*